United States Patent
Chendamarai Kannan et al.

(10) Patent No.: US 10,292,093 B2
(45) Date of Patent: May 14, 2019

(54) COMMUNICATING SUBFRAME TIMING OF AN ACCESS POINT ON A SHARED COMMUNICATION MEDIUM

(71) Applicant: QUALCOMM Incorporated, San Diego, CA (US)

(72) Inventors: Arumugam Chendamarai Kannan, San Diego, CA (US); Tao Luo, San Diego, CA (US); Chirag Sureshbhai Patel, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 15/346,986

(22) Filed: Nov. 9, 2016

(65) Prior Publication Data

US 2017/0135029 A1 May 11, 2017

Related U.S. Application Data

(60) Provisional application No. 62/253,647, filed on Nov. 10, 2015, provisional application No. 62/280,195, filed on Jan. 19, 2016.

(51) Int. Cl.
| | |
|---|---|
| *H04W 48/16* | (2009.01) |
| *H04W 72/04* | (2009.01) |
| *H04W 8/00* | (2009.01) |
| *H04L 5/00* | (2006.01) |

(Continued)

(52) U.S. Cl.
CPC .............. *H04W 48/16* (2013.01); *H04L 5/005* (2013.01); *H04W 8/005* (2013.01); *H04W 72/04* (2013.01); *H04L 5/0007* (2013.01); *H04L 5/0073* (2013.01); *H04W 88/02* (2013.01); *H04W 88/08* (2013.01)

(58) Field of Classification Search
CPC ..... H04W 48/16; H04W 8/005; H04W 72/04; H04W 88/08; H04W 88/02; H04L 5/0007; H04L 5/005; H04L 5/0073
See application file for complete search history.

(56) References Cited

U.S. PATENT DOCUMENTS

| | | | |
|---|---|---|---|
| 2010/0278132 A1* | 11/2010 | Palanki | H04B 1/7107 370/329 |
| 2011/0235743 A1* | 9/2011 | Lee | H04L 5/0048 375/295 |

(Continued)

OTHER PUBLICATIONS

International Search Report and Written Opinion—PCT/US2016/061365—ISA/EPO—dated May 22, 2017.

(Continued)

*Primary Examiner* — Edan Orgad
*Assistant Examiner* — Nourali Mansoury
(74) *Attorney, Agent, or Firm* — Qualcomm Incorporated

(57) ABSTRACT

Techniques for indicating and determining a subframe timing of an access point on a shared communication medium are disclosed. A method of transmitting a discovery reference signal (DRS) may include establishing a transmission timing for transmission of the DRS relative to a system timing of an access point, determining whether to transmit the DRS during a particular SF based on the selected DRS transmission window, and transmitting the DRS to at least one access terminal during the particular SF in response to a determination to transmit the DRS.

52 Claims, 14 Drawing Sheets

(51) Int. Cl.
　　*H04W 88/02*　　(2009.01)
　　*H04W 88/08*　　(2009.01)

(56) References Cited

U.S. PATENT DOCUMENTS

2016/0037513 A1* 2/2016 Zhang ............... H04W 72/0446
　　　　　　　　　　　　　　　　　　　　　370/336
2017/0034808 A1* 2/2017 Ouchi ................. H04W 72/042

OTHER PUBLICATIONS

NTT DOCOMO et al., "WF on LAA DRS design and transmission timing," 3GPP TSG RAN WG1 Meeting #82, R1-154817, Aug. 24-28, 2015, 4 pages, XP051044998. Retrieved from the Internet: URL:http://www.3gpp.org/ftp/tsg_ran/WG1_RL1/TSGR1_82/Docs/ [retrieved on Aug. 30, 2015].

Partial International Search Report—PCT/US2016/061365—ISA/EPO—dated Feb. 7, 2017.
Samsung: "Remaining Details of DRS Design," 3GPP Draft; R1-155465 Remaining Details of DRS Design, 3rd Generation Partnership Project (3GPP), Mobile Competence Centre 650 , Route Des Lucioles ; F-06921 Sophia-Antipolis Cedex ; France vol. RAN WG1, no. Malmo, Sweden; 20151005-20151009 Oct. 4, 2015 (Oct. 4, 2015), XP051002370 Retrieved from the Internet: URL:http://www.3gpo.org/ftp/Meetings_3GPP_SYNC/RAN1/Docs/ [retrieved on Oct. 4, 2015].
ZTE: "Details of DRS design for LAA," 3GPP Draft; R1-155533 Details of DRS Design for LAA, 3rd Generation Partnership Project (3GPP), Mobile Competence Centre ; 650, Route Des Lucioles ; F-06921 Sophia-Antipolis Cedex ; France vol. RAN WG1, no. Malmo, Sweden; 20151005-20151009 Oct. 4, 2015 (Oct. 4, 2015), XP051002414, Retrieved from the Internet; URL:http://www.3gpp.org/ftp/Meetings_3GPP_SYNC/RAN1/Docs/ - -[retrieved on Oct. 4, 2015] figure 1 p. 1-p. 2.

* cited by examiner

COMMUNICATING SUBFRAME TIMING OF AN ACCESS POINT ON A SHARED COMMUNICATION MEDIUM

CROSS-REFERENCE TO RELATED APPLICATIONS

The present Application for Patent claims the benefit of U.S. Provisional Application No. 62/253,647, entitled "COMMUNICATING SUBFRAME TIMING OF AN ACCESS POINT ON A SHARED COMMUNICATION MEDIUM", filed Nov. 10, 2015, assigned to the assignee hereof, and expressly incorporated herein by reference in its entirety, and U.S. Provisional Application No. 62/280,195, entitled "COMMUNICATING SUBFRAME TIMING OF AN ACCESS POINT ON A SHARED COMMUNICATION MEDIUM", filed Jan. 19, 2016, assigned to the assignee hereof, and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for indicating and determining a subframe timing of an access point on a shared communication medium are disclosed.

In an aspect of the disclosure, a method of transmitting a discovery reference signal (DRS) is disclosed. The method may include establishing a transmission timing for transmission of the DRS relative to a system timing of an access point, wherein establishing the transmission timing comprises for a particular system frame defined by the system timing of the access point, selecting a DRS transmission window, the selected DRS transmission window comprising one or more subframes (SFs) during which the DRS may be selectively transmitted, wherein the selected DRS transmission window is selected from a group comprising a first transmission window comprising two or more consecutive SFs and a second transmission window comprising one SF, and determining whether to transmit the DRS during a particular SF based on the selected DRS transmission window, and transmitting the DRS to at least one access terminal during the particular SF in response to a determination to transmit the DRS.

In another aspect of the disclosure, an apparatus for transmitting a DRS is disclosed. The apparatus may comprise a transceiver configured to transmit the DRS to at least one access terminal during a particular subframe (SF) in response to a determination to transmit the DRS, and memory and at least one processor coupled to the memory, the processor being configured to establish a transmission timing for transmission of the DRS relative to a system timing of an access point, wherein to establish the transmission timing, the processor is configured to for a particular system frame defined by the system timing of the access point, select a DRS transmission window, the selected DRS transmission window comprising one or more SFs during which the DRS may be selectively transmitted, wherein the selected DRS transmission window is selected from a group comprising a first transmission window comprising two or more consecutive SFs and a second transmission window comprising one SF, and determine whether to transmit the DRS during the particular SF based on the selected DRS transmission window.

In yet another aspect of the disclosure, another apparatus for transmitting a DRS is disclosed. The apparatus may comprise means for establishing a transmission timing for transmission of the DRS relative to a system timing of an access point, wherein means for establishing the transmission timing comprises means for selecting a DRS transmission window for a particular system frame defined by the system timing of the access point, the selected DRS transmission window comprising one or more subframes (SFs) during which the DRS may be selectively transmitted, wherein the selected DRS transmission window is selected from a group comprising a first transmission window comprising two or more consecutive SFs and a second transmission window comprising one SF, and means for determining whether to transmit the DRS during a particular SF based on the selected DRS transmission window, and means for transmitting the DRS to at least one access terminal during the particular SF in response to a determination to transmit the DRS.

In yet another aspect of the disclosure, a non-transitory computer-readable medium including code is disclosed. The code, when executed by a processor, causes the processor to perform operations, and the non-transitory computer-readable medium comprises code for establishing a transmission timing for transmission of the DRS relative to a system timing of an access point, wherein code for establishing the transmission timing comprises code for selecting a DRS transmission window for a particular system frame defined by the system timing of the access point, the selected DRS transmission window comprising one or more subframes (SFs) during which the DRS may be selectively transmitted, wherein the selected DRS transmission window is selected from a group comprising a first transmission window comprising two or more consecutive SFs and a second transmission window comprising one SF, code for determining whether to transmit the DRS during a particular SF based on the selected DRS transmission window, and code for transmitting the DRS to at least one access terminal during the particular SF in response to a determination to transmit the DRS.

In yet another aspect of the disclosure, a method of indicating a system timing of an access point is disclosed. The method coms determining a subframe index value of a particular subframe (SF) relative to the system timing of the access point, determining a subframe offset value based on the subframe index value, indicating the subframe offset value using a DRS, and transmitting the DRS to at least one access terminal during the particular SF.

In yet another aspect of the disclosure, an apparatus for indicating a system timing of an access point is disclosed. The apparatus comprises a transceiver configured to transmit a DRS to at least one access terminal during a particular subframe (SF), memory and at least one processor coupled to the memory, the processor being configured to determine a subframe index value of the particular SF relative to the system timing of the access point, determine a subframe offset value based on the subframe index value, and indicate the subframe offset value using the DRS.

In yet another aspect of the disclosure, another apparatus for indicating a system timing of an access point is disclosed. The apparatus comprises means for determining a subframe index value of a particular subframe (SF) relative to the system timing of the access point, means for determining a subframe offset value based on the subframe index value, means for indicating the subframe offset value using a DRS, and means for transmitting the DRS to at least one access terminal during the particular SF.

In yet another aspect of the disclosure, a non-transitory computer-readable medium including code is disclosed. The code, when executed by a processor, causes the processor to perform operations, and the non-transitory computer-readable medium comprises code for determining a subframe index value of a particular subframe (SF) relative to a system timing of an access point, code for determining a subframe offset value based on the subframe index value, code for indicating the subframe offset value using a DRS, and code for transmitting the DRS to at least one access terminal during the particular SF.

In yet another aspect of the disclosure, a method of determining a system timing of an access point is disclosed. The method comprises receiving a DRS from the access point during a particular subframe (SF), determining a subframe offset value based on the DRS, determining a subframe index value of the particular SF relative to the system timing of the access point, based on the determined subframe offset value, and resolving the system timing of the access point based on the determined subframe index value.

In yet another aspect of the disclosure, an apparatus for determining a system timing of an access point is disclosed. The apparatus comprises a transceiver configured to receive a DRS from an access point during a particular subframe (SF), memory and at least one processor coupled to the memory, the processor being configured to determine a subframe offset value based on the DRS, determine a subframe index value of the particular SF relative to the system timing of the access point, based on the determined subframe offset value, and resolve the system timing of the access point based on the determined subframe index value.

In yet another aspect of the disclosure, another apparatus for determining a system timing of an access point is disclosed. The apparatus comprises means for receiving a DRS from an access point during a particular subframe (SF), means for determining a subframe offset value based on the DRS, means for determining a subframe index value of the particular SF relative to the system timing of the access point, based on the determined subframe offset value, and means for resolving the system timing of the access point based on the determined subframe index value.

In yet another aspect of the disclosure, a non-transitory computer-readable medium including code is disclosed. The code, when executed by a processor, causes the processor to perform operations, and the non-transitory computer-readable medium comprises code for receiving a DRS from an access point during a particular subframe (SF), code for determining a subframe offset value based on the DRS, code for determining a subframe index value of the particular SF relative to the system timing of the access point, based on the determined subframe offset value, and code for resolving the system timing of the access point based on the determined subframe index value.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to determining a subframe timing of an access point on a shared communication medium.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on" or "based only on".

Figure 1A:
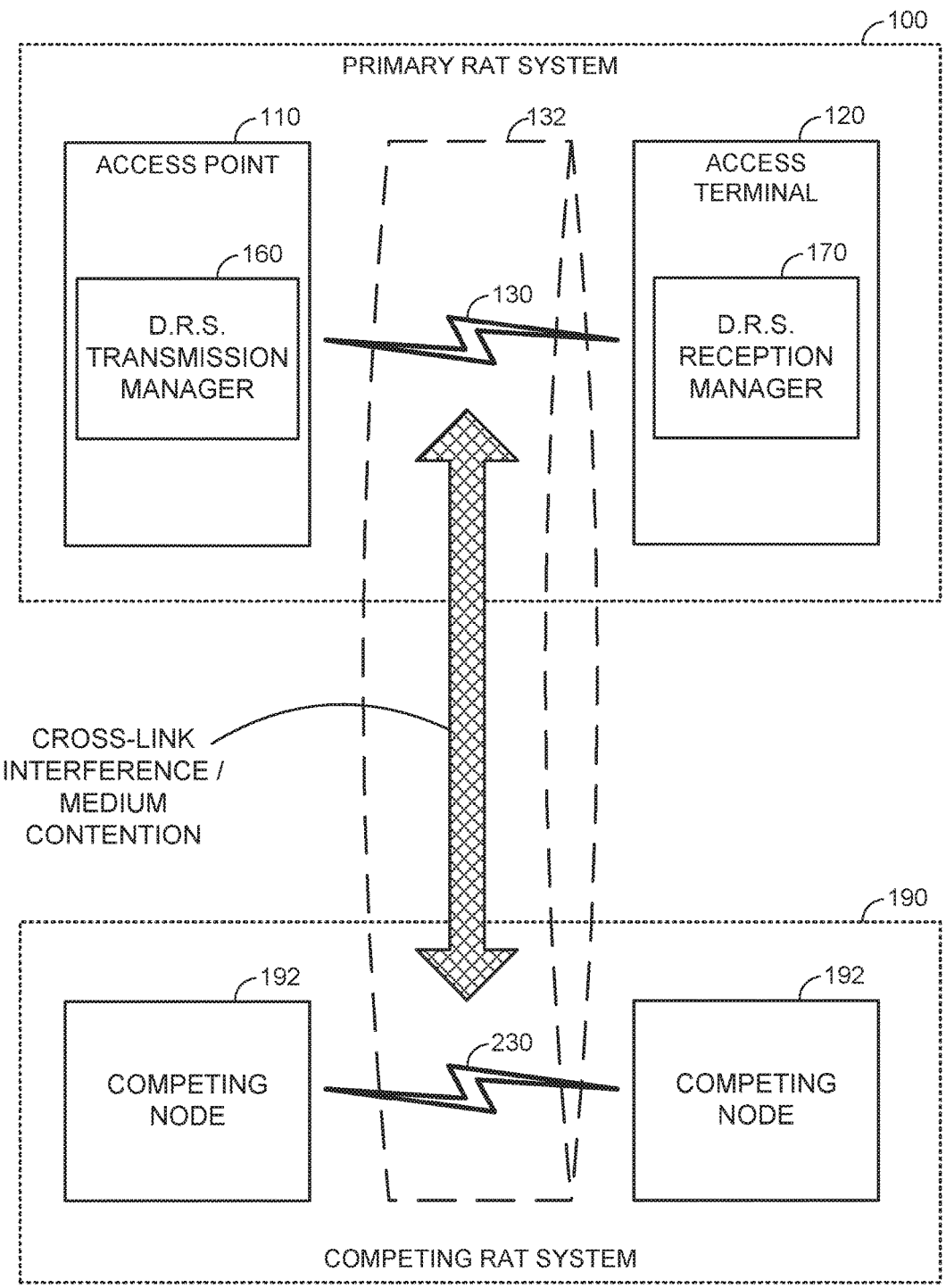
FIG. 1A is a system-level diagram illustrating an example wireless network environment.

FIG. 1A is a system-level diagram illustrating an example wireless network environment, shown by way of example as including a primary Radio Access Technology (RAT) system 100 and a competing RAT system 190. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 190 is shown as including two competing nodes 192 in communication with each other over a separate wireless link 230, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 192 of the competing RAT system 190 may communicate via the wireless link 230 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1A, the wireless link 130 used by the primary RAT system 100 and the wireless link 230 used by the competing RAT system 190 may operate over a shared communication medium 132. A communication medium of this type may be composed of one or more frequency, time, and/or space communication resources (e.g., encompassing one or more channels across one or more carriers). As an example, the communication medium 132 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 132, there is the potential for cross-link interference between the wireless link 130 and the wireless link 230. Further, some RATs and some jurisdictions may require contention or "Listen Before Talk (LBT)" for access to the communication medium 132. As an example, the Wi-Fi IEEE 802.11 protocol family of standards provides a Carrier Sense Multiple Access/Collision Avoidance (CSMA/CA) protocol in which each Wi-Fi device verifies via medium sensing the absence of other traffic on a shared communication medium before seizing (and in some cases reserving) the communication medium for its own transmissions. As another example, the European Telecommunications Standards Institute (ETSI) mandates contention for all devices regardless of their RAT on certain communication mediums such as unlicensed frequency bands.

As will be described in more detail below, the access point 110 and/or the access terminal 120 may be variously configured in accordance with the teachings herein to provide or otherwise support the communication techniques discussed briefly above. For example, the access point 110 may include a DRS transmission manager 160, while the access terminal 120 may include a DRS reception manager 170.

Figure 1B:
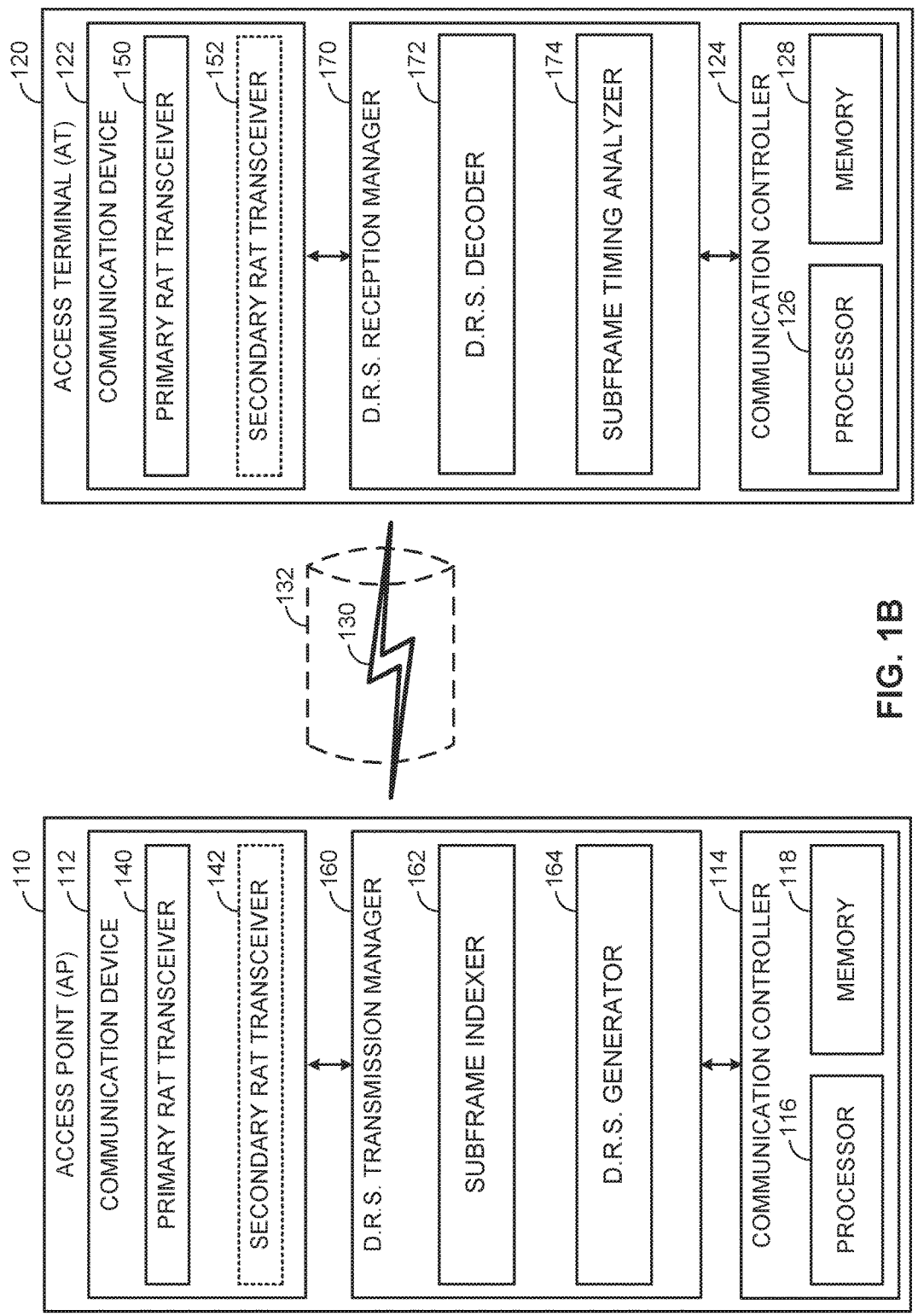
FIG. 1B is a device-level diagram illustrating example components of the access point and the access terminal of the wireless network in FIG. 1A in more detail.

FIG. 1B is a device-level diagram illustrating example components of the access point 110 and the access terminal 120 of the primary RAT system 100 in more detail. As shown, the access point 110 and the access terminal 120 may each generally include a wireless communication device (represented by the communication devices 112 and 122) for communicating with other wireless nodes via at least one designated RAT. The communication devices 112 and 122 may be variously configured for transmitting and encoding signals, and, conversely, for receiving and decoding signals in accordance with the designated RAT (e.g., messages, indications, information, pilots, and so on).

The communication devices 112 and 122 may include, for example, one or more transceivers, such as respective primary RAT transceivers 140 and 150, and, in some designs, (optional) co-located secondary RAT transceivers 142 and 152, respectively (corresponding, for example, to the RAT employed by the competing RAT system 190). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may include one or more processors 116 and 126, and one or more memories 118 and 128 coupled to the processors 116 and 126, respectively. The memories 118 and 128 may be configured to store data, instructions, or a combination thereof, either as on-board cache memory, as separate components, a combination, etc. The processors 116 and 126 and the memories 118 and 128 may be standalone communication components or may be part of the respective host system functionality of the access point 110 and the access terminal 120.

In the illustrated example, the DRS transmission manager 160 of the access point 110 includes a subframe indexer 162 and a DRS generator 164. Similarly, the control DRS reception manager 170 of the access terminal 120 includes a DRS decoder 172 and a subframe timing analyzer 174. It will be appreciated, however, that the DRS transmission manager 160 and the DRS reception manager 170 may be implemented in different ways, and that some or all of the functionality associated therewith may be implemented by or otherwise at the direction of at least one processor (e.g., one or more of the processors 116 and/or one or more of the processors 126) and at least one memory (e.g., one or more of the memories 118 and/or one or more of the memories 128).

Figure 2:
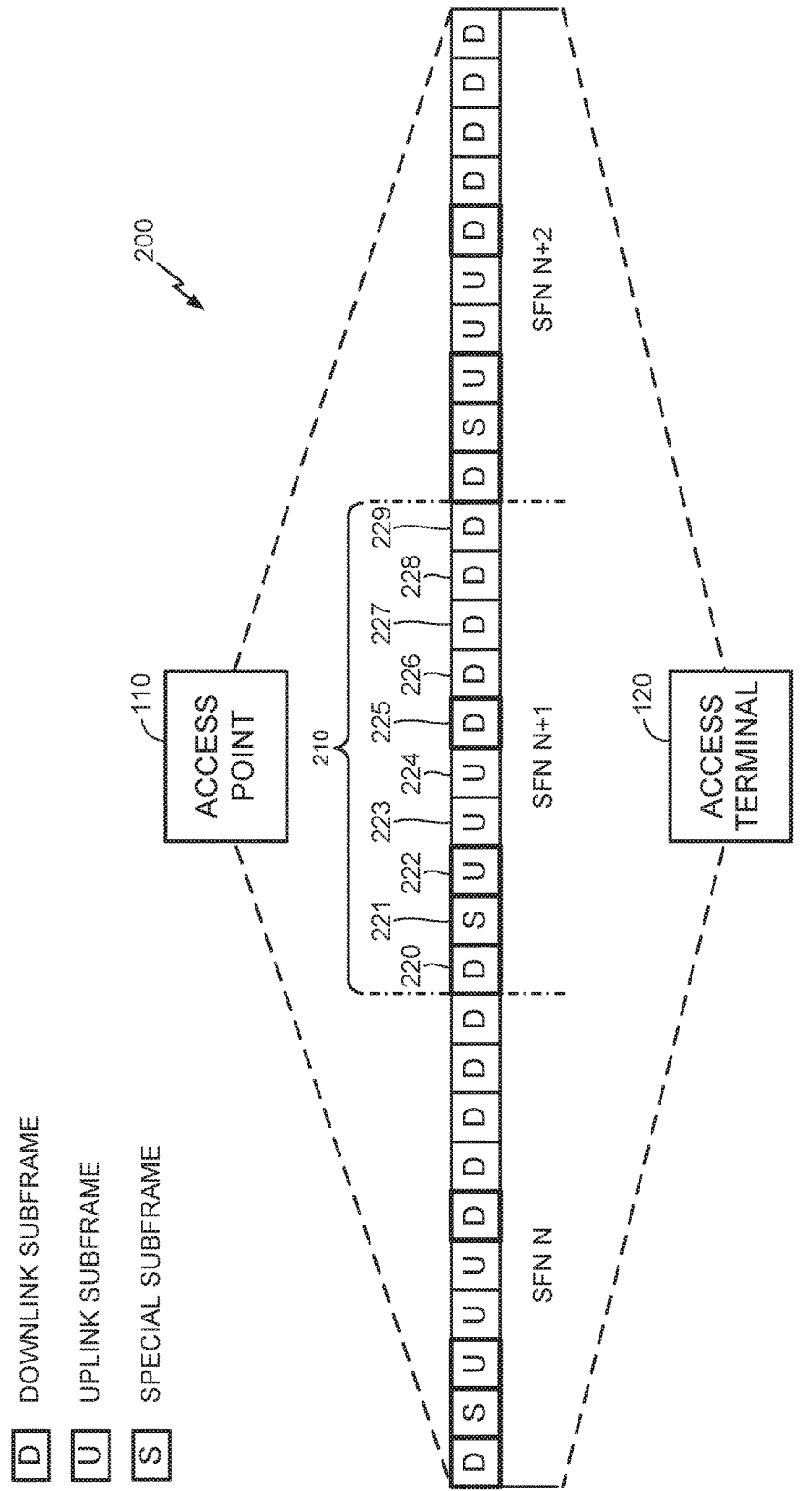
FIG. 2 illustrates an example Time Division Duplexing (TDD) frame structure.

FIG. 2 illustrates an example Time Division Duplexing (TDD) frame structure that may be implemented for the primary RAT system 100 to facilitate contention-based access to the communication medium 132.

The illustrated frame structure includes a sequence of consecutive radio frames (RFs) that are indexed in accordance with a System Frame Number (SFN) numerology (SFN N, N+1, N+2, etc.). A particular access point, such as the access point 110, may operate in accordance with a particular system timing. The system timing of the access point 110 may be defined by a hierarchical structure of system frames and subframes, slots, and symbol periods. As an example, the LTE frame structure includes a repeating sequence of one-thousand and twenty four (1024) non-overlapping radio frames. Each system frame may be indexed in accordance with a system frame number (SFN) indexing scheme. In particular, a first system frame may be indexed as SFN 0, an immediately subsequent subframe may be indexed as SFN 1, and the indexing may proceed to SFN 1023 before starting over at SFN 0.

Each system frame (SFN 0, SFN, 1 . . . SFN 1023, etc.) may include a repeating sequence of ten (10) non-overlapping subframes. Each subframe (SF) may be indexed in accordance with an analogous indexing scheme. In particular, a first subframe may be indexed as SF0, an immediately subsequent subframe may be indexed as SF1, and the indexing may proceed to SF9 before starting over at SF0. Under an LTE system timing, each subframe (SF0, SF1 . . . SF9) may have a duration of one millisecond, each system frame may have a duration of ten milliseconds, and a complete SFN cycle may have a duration of 10.24 seconds.

Each respective subframe may be further divided into slots (not shown in FIG. 2), and the slots may be further divided into symbol periods. Each subframe may comprise two slots, and each slot may comprise six symbol periods, seven symbol periods, or any other suitable number of symbol periods. The use of a frame structure to achieve system timing may provide more natural and efficient coordination among devices than more ad hoc signaling techniques.

In the example frame structure of FIG. 2, each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios.

In the illustrated example of FIG. 2, a TDD configuration is employed that is similar to TDD Config 3 in LTE. In particular, a system timing 200 includes a plurality of sequential system frames. The plurality of sequential system frames may be indexed in accordance with the aforementioned SFN numerology (SFN N, N+1, N+2, etc.). In the example illustration of FIG. 2, one particular system frame in the sequence is labeled as a system frame 210. The system frame 210 includes ten indexed subframes 220-229. In the example illustration of FIG. 2, a subframe 220 (having subframe index SF0), a subframe 225 (having subframe index SF5), a subframe 226 (having subframe index SF6), a subframe 227 (having subframe index SF7), a subframe 228 (having subframe index SF8), and a subframe 229 (having subframe index SF9) are each operated as a downlink subframe. By contrast, a subframe 222 (having subframe index SF2), a subframe 223 (having subframe index SF3), and a subframe 224 (having subframe index SF4) are each operated as uplink subframes and subframe 221 (having subframe index SF1) is operated as a special subframe.

In some designs, the frame structure of FIG. 2 may be "fixed" in that the location of each frame/subframe may be predetermined in relation to an absolute time, but may or may not be occupied by primary RAT signaling in any given instance due to the contention procedure for accessing the communication medium 132. For example, if the access point 110 or the access terminal 120 fails to win contention for a given subframe that subframe may be silenced. In other designs, however, the frame structure of FIG. 2 may be "floating" in that the location of each subframe may be dynamically determined in relation to the point at which access to the communication medium 132 is secured. For example, the start of a given frame (e.g., SFN N) may be delayed in relation to an absolute time until the access point 110 or the access terminal 120 is able to win contention.

Figure 3:
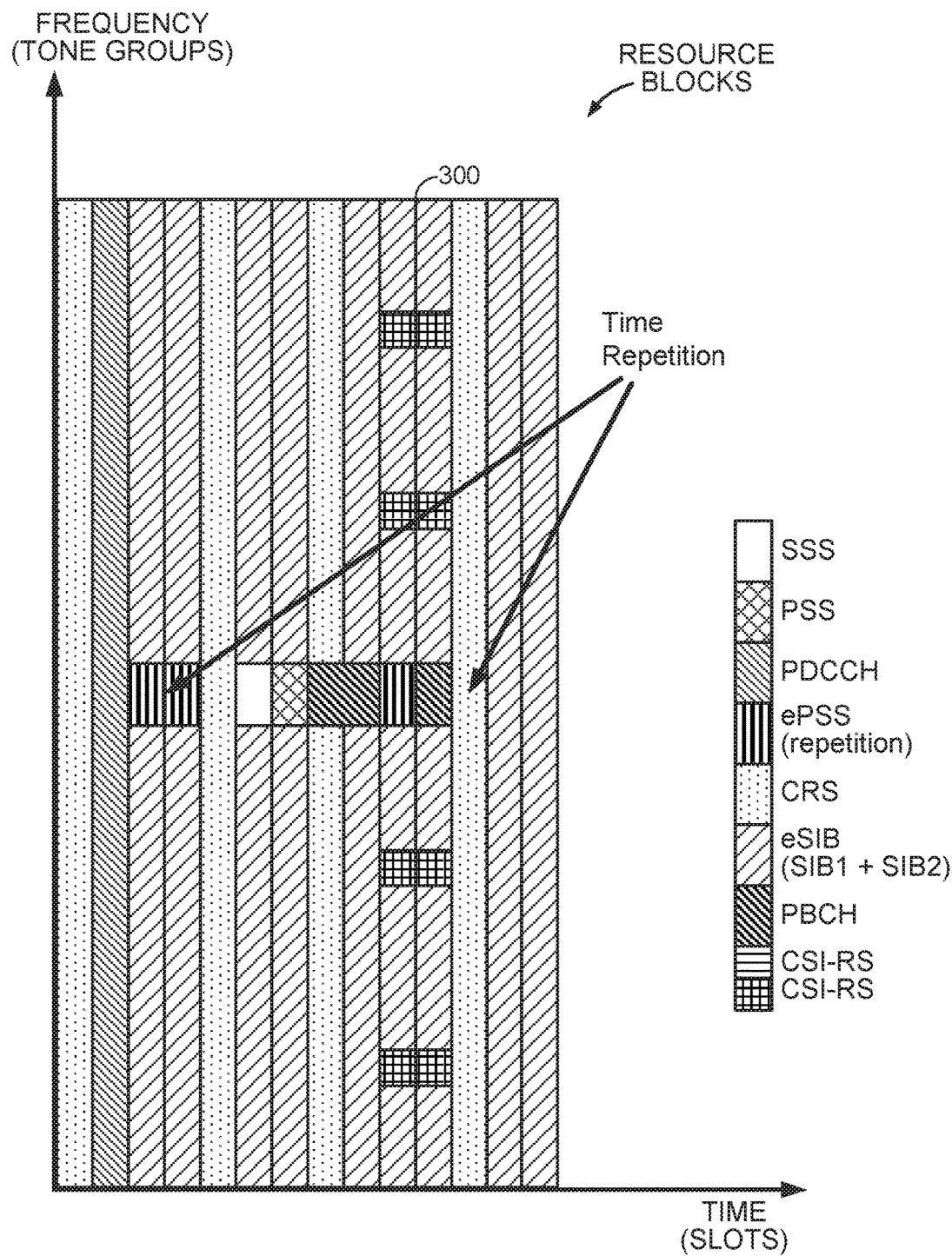
FIG. 3 generally illustrates an example of a resource block diagram.

FIG. 3 is a resource block diagram illustrating an example of a DRS 300 (wherein DRS stands for Discovery Reference Signal). As depicted in FIG. 3, the DRS 300 may be configured as an Enhanced Discovery Reference Signaling (eDRS) across slots of a given subframe. The resource block diagram of FIG. 3 includes a plurality of resource blocks. Each resource block may include a plurality of resource elements. A resource block is associated with a particular location in the time domain (the x-axis in FIG. 3) and a particular location in the frequency domain (the y-axis in FIG. 3). In FIG. 3, each resource block is associated with a particular slot in the time domain and a particular tone group in the frequency domain. However, it will be understood that this is merely an example and that the time domain and frequency domain may be divided in other ways. For example, the time domain may be divided into radio frames, subframes, and/or symbols.

In this example, the resource block diagram includes a DRS 300 having resource blocks associated with a Secondary Synchronization Signal (SSS), a Primary Synchronization Signal (PSS), a Physical Downlink Control Channel (PDCCH), an enhanced PSS (ePSS), a Cell-specific Reference Signal (CRS), enhanced SIB (eSIB) signaling, a Physical Broadcast Channel (PBCH), and a Channel State Information Reference Signal (CSI-RS). The PBCH may carry, for example, a MIB. However, it will be understood that this is merely an illustration and that the particular location (i.e., resource block) associated with a given signal may be different. Additionally or alternatively, a given signal may be omitted entirely, and other signals may be added. Moreover, as will be discussed in greater detail below, the timing of the DRS (for example, the eDRS depicted in FIG. 3) may in fact be uncertain.

Figure 4:
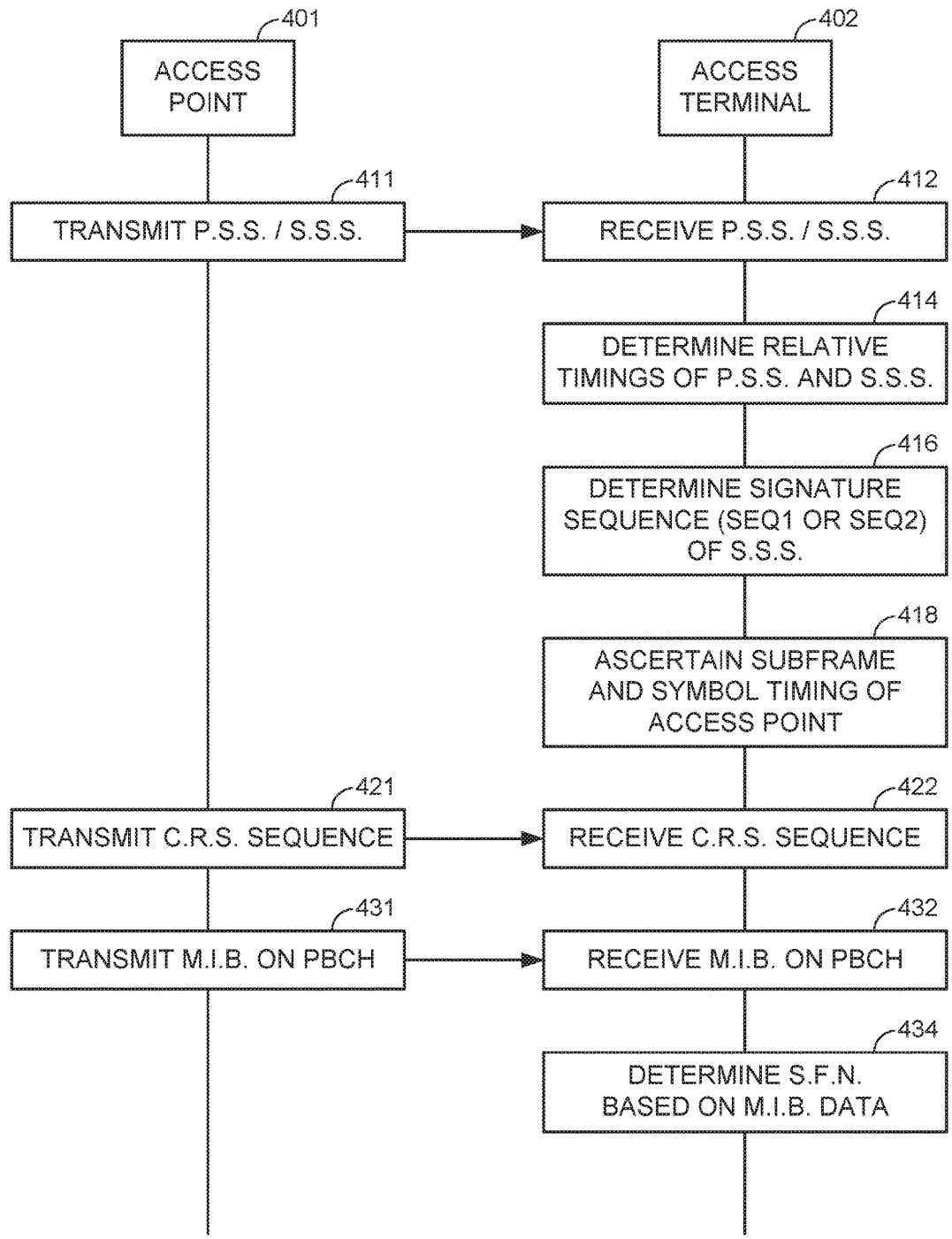
FIG. 4 generally illustrates a signal flow diagram for communicating system information (SI) in accordance with an aspect of the disclosure.

FIG. 4 generally illustrates a signal flow diagram for communicating system information (SI) in accordance with an aspect of the disclosure.

At 411, the access point 110 transmits a PSS and an SSS and at 412, an access terminal 120 receives the PSS and the SSS. In some implementations, the access point 110 may transmit the PSS and SSS in subframes 0 and 5 (SF0 and SF5).

Accordingly, the PSS will be transmitted with a periodicity of 5 ms and the SSS will also be transmitted with a periodicity of 5 ms. However, the relative transmission timings of the PSS and SSS can be used to indicate, for example, a duplex mode of the access point 110.

At 414, the access terminal 120 determines the relative timings at which the PSS and SSS were received. For example, the access terminal 120 may determine if the SSS and PSS were received at consecutive symbols or at spaced symbols. As will be explained in greater detail below, the relative timings at which the PSS and SSS were received can be used to ascertain the timing of the access point 110.

At 416, the access terminal 120 determines the signature sequence of the SSS. For example, the access terminal 120 may determine if the SSS uses a first signature sequence (SEQ1) or a second signature sequence (SEQ2). As will be explained in greater detail below, the signature sequence of the SSS can be used to ascertain the timing of the access point 110.

At 418, the access terminal 120 ascertains the subframe and symbol timing of the access point 110.

In some implementations, if the access point 110 is using time-division duplexing (TDD), the access point 110 will transmit the PSS in the third symbol of the first slot in subframes 1 and 6 (SF1 and SF6) and will transmit the SSS in the seventh symbol of the first slot of subframes 0 and 5 (SF0 and SF5). If the access point 110 is using frequency-division duplexing (FDD), the access point 110 will transmit the PSS in the seventh symbol of the first slot of SF0 and SF5, and transmits the SSS immediately prior to the PSS (in the sixth symbol of the first slot of SF0 and SF5). Accordingly, after receiving the PSS and SSS, the access terminal 120 can determine the duplex mode of the system based on the relative timings of the PSS and SSS. If the SSS and PSS are received at consecutive symbols, this indicates that the access point 110 is operating using FDD, and if the SSS and PSS are received three symbols apart from one another, then the access terminal 120 can ascertain that the access point 110 is operating using TDD.

The access terminal 120 can also determine the subframe timing of the access point 110 based on the relative timings of the SSS and PSS. If the SSS and PSS are received at consecutive symbols, then the access terminal 120 can ascertain that the SSS was received in the fifth symbol and the PSS was received in the sixth symbol, and if the SSS and PSS are received three symbols apart from one another, then the access terminal 120 can ascertain that the SSS was received in the seventh symbol of a first slot and that the PSS was received in the third symbol of the next slot.

In some implementations, the access point 110 transmits the SSS using either a first SSS signature sequence (SEQ1) or a second SSS signature sequence (SEQ2) that is different from the SEQ1. The SSS transmitted in SF0 may be transmitted using SEQ1, whereas the SSS transmitted in SF5 may be transmitted using SEQ2. Accordingly, after receiving the SSS and determining the signature sequence thereof, the access terminal 120 can determine whether the SSS was transmitted during SF0 or SF5.

At 421, the access point 110 transmits a CRS in accordance with a predetermined CRS sequence that includes a plurality of reference symbols, and at 422, the access terminal 120 receives the CRS. In some implementations, the predetermined CRS sequence is based on a cell identifier associated with the access point 110. Accordingly, the predetermined CRS sequence is unique to the access point 110, or (at least) unlikely to be similar to other CRS sequences being broadcast by neighboring access points. The predetermined CRS sequence may be characterized by a particular symbol value or scrambling code for each of the plurality of reference symbols, a specific spacing between adjacent reference symbols in the time or frequency domain, and/or a frequency shift of the plurality of reference symbols relative to a predetermined frequency. In some implementations, the predetermined CRS sequence is repeated in every slot of every subframe. The access terminal 120 may use the CRS for channel estimation (for example, to estimate a downlink power level of the access point 110).

At 431, the access point 110 transmits a MIB and at 432, the access terminal 120 receives the MIB. In some implementations, the MIB may be transmitted on, for example a Broadcast Control Channel (BCCH) of the Physical Broadcast Channel (PBCH). The MIB may indicate a System Frame Number (SFN) associated with the access point 110. The SFN may include, for example, ten bits of SFN data. The SFN data or a portion thereof (for example, eight bits) may be included in the MIB.

The PBCH (which includes at least a portion of the MIB) may be transmitted intermittently. For example, the PBCH may be transmitted using the first four symbols of the second slot in SF0. Accordingly, the PBCH may be transmitted once every system frame, i.e., every 10 milliseconds.

The PBCH may carry the same payload in every transmission. However, the PBCH may transmit using one of four redundancy versions (RV0, RV1, RV2, or RV3). For example, the first redundancy version RV0 may be used in a first system frame (e.g., SFN={0, 4, 8, 12, etc.}), the second redundancy version RV1 may be used in a second system frame (e.g., SFN={1, 5, 9, 13, etc.}), the third redundancy version RV2 may be used in a third system frame (e.g., SFN={2, 6, 10, 14, etc.}), and the fourth redundancy version RV3 may be used in a fourth system frame (e.g., SFN={3, 7, 11, 15, etc.}). The access terminal 120 may achieve combining gains by combining the four RVs of the PBCH payload. At 434, the access terminal 120 may determine the SFN of the access point 110 based on the MIB data.

Although FIG. 4 depicts the transmissions 411, 421, and 431 as occurring in a specific sequence, it will be understood that the PSS, SSS, CRS reference symbols, and MIB may be transmitted and received and/or processed in any sequence.

As can be appreciated by the foregoing, some techniques for communicating SI rely on a fixed timing mechanism. By contrast, the access point 110 in the primary RAT system 100 may be configured to improve coexistence by avoiding transmission at certain times and/or frequencies. Accordingly, it may be impossible for the access point 110 to transmit the SI in accordance with the fixed timing mechanism. As a result, the access terminal 120 may not receive the SI.

To improve coexistence, the access point 110 of the present disclosure may be configured to transmit SI with an uncertain timing, i.e., a timing that cannot be ascertained by the access terminal 120 using the method depicted in FIG. 4. Instead, Discovery Reference Signaling may be consolidated into a single data block (such as, for example, the eDRS signaling configuration depicted in FIG. 3).

As noted above, an unmodified MIB (such as the MIB transmitted at 431 and received at 432 in FIG. 4) may include SFN data. However, since MIB data (or a portion thereof) may be transmitted at an uncertain timing as a part of the DRS, then the access point 110 may be configured to communicate the SFN data to the access terminal 120 by relying on the unmodified MIB in combination with PBCH payload, PBCH RV, SSS signature sequence and/or CRS scrambling. In accordance with an aspect of the disclosure, the access point 110 may communicate the SFN to the access terminal 120, in whole or in part, using a PBCH payload, a PBCH redundancy version, an SSS signature sequences, and/or CRS scrambling.

Figure 5:
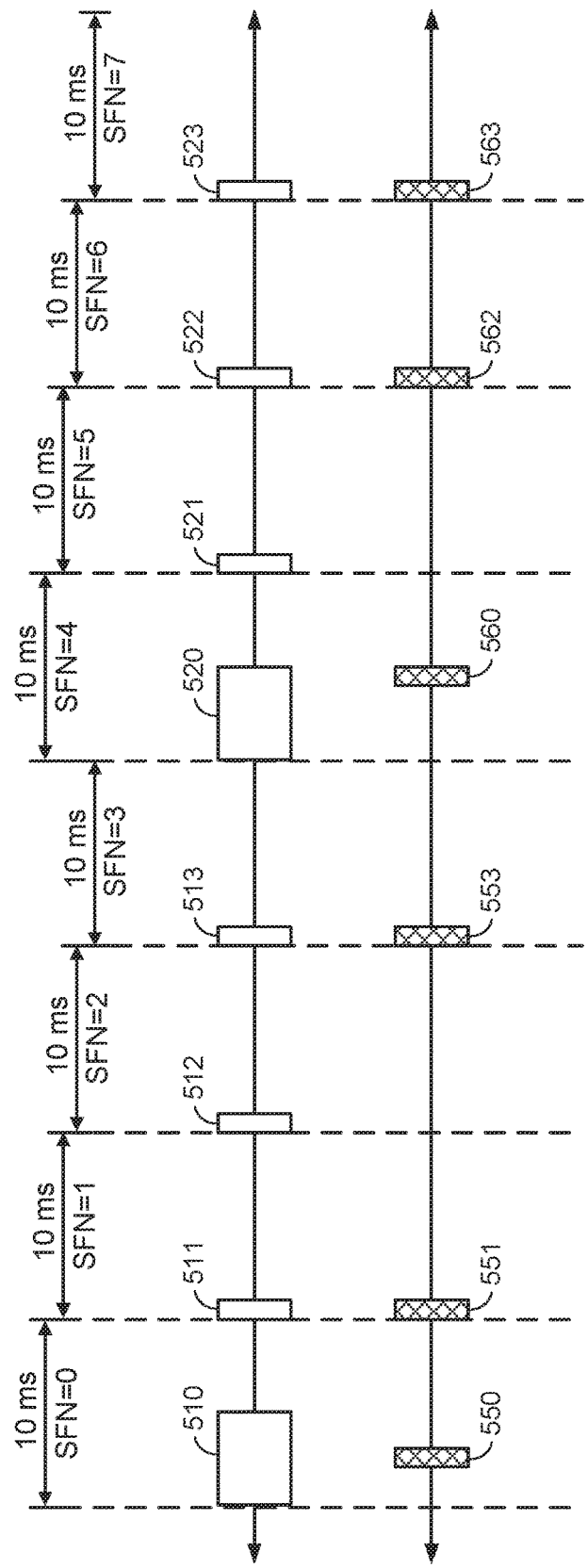
FIG. 5 generally illustrates an example DRS transmission timing.

FIG. 5 illustrates an example DRS transmission timing that may be implemented for the primary RAT system 100 to facilitate contention-based access to the communication medium 132. For purposes of illustration, FIG. 5 depicts eight system frames having SFNs '0' through '7'. Each system frame has a duration of ten milliseconds.

In some implementations, the access point 110 depicted in FIGS. 1A-1B may be configured for windowed transmission of the DRS within a Discovery Reference Signaling (DRS) Measurement Timing Configuration window (DMTC window). The DRS may include one or more of the signals depicted in FIG. 3, for example, the SSS, CRS, PBCH, PDCCH, and eSIB. Transmission of the DRS may only require one millisecond (i.e., one subframe), although other timings are possible.

FIG. 5 depicts a first DMTC window 510 and a second DMTC window 520. Each DMTC window may have a predetermined duration. As depicted in FIG. 5, the predetermined duration of each of the DMTC windows 510 and 520 may be, for example, five milliseconds (i.e., five subframes). The predetermined duration may be known in advance by both the access point 110 and the access terminal 120. Moreover, the predetermined duration of each of the DMTC windows 510 and 520 may be greater than the amount of time required to perform a complete transmission of the DRS.

Each DMTC window may also have a predetermined periodicity. In the example depicted in FIG. 5, the predetermined periodicity of the DMTC windows 510 and 520 may be, for example, 40 milliseconds (i.e., every fourth radio frame), however, as will be discussed elsewhere in the present disclosure, the predetermined periodicity may also be, for example, 20 milliseconds (i.e., every other radio frame). Accordingly, the first DMTC window 510 is depicted within the system frame having an SFN of '0' and the second DMTC window 520 is depicted within the system frame having an SFN of '4'. Although only two DMTC windows 510 and 520 are shown, it will be understood that the pattern depicted in FIG. 5 may be repeated indefinitely.

FIG. 5 also depicts opportunistic transmission windows at 511, 512, 513, 521, 522, and 523. Each of the opportunistic transmission windows 511, 512, 513, 521, 522, and 523 may have a predetermined duration. As depicted in FIG. 5, the predetermined duration of each of the opportunistic transmission windows 511, 512, 513, 521, 522, and 523 may be, for example, one millisecond (i.e., one subframe). The predetermined duration may be known in advance by both the access point 110 and the access terminal 120. Moreover, the predetermined duration of each of the opportunistic transmission windows 511, 512, 513, 521, 522, and 523 may be equal to the amount of time required to perform a complete transmission of the DRS.

In some implementations, the access point 110 may be configured to transmit the DRS at a timing and/or frequency that improves the coexistence of the primary RAT system 100 and the competing RAT system 190. In accordance with an aspect of the disclosure, the access point 110 may be configured to transmit the DRS during each of the DMTC windows 510 and 520. However, the DRS may be transmitted at any time during the DMTC windows 510 and 520.

For example, the access point 110 may contend for access to transmit the DRS during the first subframe of the DMTC window 510. If the access point 110 succeeds in contending for access, then it may transmit the DRS during the first subframe of the DMTC window 510. However, if the access point 110 does not succeed in contending for access, then it may not transmit the DRS during the first subframe of the DMTC window 510. Instead, the access point 110 may contend for access in the second subframe, third subframe, etc., until contention is successful. In some implementations, the access point 110 transmits the DRS in the final subframe of the DMTC window regardless of whether it has successfully contended for access.

In accordance with an aspect of the disclosure, the access point 110 may be configured to attempt transmission of the DRS during each of the opportunistic transmission windows 511, 512, 513, 521, 522, and 523. The access point 110 will transmit a DRS during every opportunistic transmission window 511, 512, 513, 521, 522, or 523 in which it successfully contends for access. If the access point 110 fails to successfully contend for access during a particular opportunistic transmission window 511, 512, 513, 521, 522, or 523, then the access point 110 will not transmit a DRS during that particular opportunistic transmission window 511, 512, 513, 521, 522, or 523.

In the example depicted in FIG. 5, the access point 110 performs a DRS transmission 550 in the third subframe of the DMTC window 510. As an example, the access point 110 may have unsuccessfully contended for access during the first subframe and second subframe of the DMTC window 510, but successfully contended for access during the third subframe. Accordingly, the access point 110 has transmitted the DRS transmission 550 during the third subframe of the DMTC window 510.

The access point 110 also performs a DRS transmission 551 during the opportunistic transmission window 511 and a DRS transmission 553 during the opportunistic transmission window 513. As an example, the access point 110 may have successfully contended for access during the opportunistic transmission windows 511 and 513, but failed to successfully contend for access during the opportunistic transmission window 512. Accordingly, DRS transmissions 551 and 553 were performed in the opportunistic transmission windows 511 and 513, respectively, but no DRS transmission was performed during the opportunistic transmission window 512.

The access point 110 also performs a DRS transmission 560 in the fifth subframe of the DMTC window 520. As an example, the access point 110 may have unsuccessfully contended for access during the first through fourth subframes of the DMTC window 520. As a result, the access point 110 has transmitted the DRS transmission 560 during the final subframe of the DMTC window 520.

The access point 110 also performs a DRS transmission 562 during the opportunistic transmission window 522 and a DRS transmission 563 during the opportunistic transmission window 523. As an example, the access point 110 may have failed to successfully contend for access during the opportunistic transmission window 521, but succeeded during the opportunistic transmission windows 522 and 523. Accordingly, no DRS transmission was performed during the opportunistic transmission window 521, but DRS transmissions 562 and 563 were performed in the opportunistic transmission windows 522 and 523, respectively.

It will be understood that the DRS transmissions 550, 551, 553, 560, 562, and 563 are shown solely for illustrative purposes, and that any suitable transmission pattern may be used in accordance with aspects of the present disclosure. As noted above, in some implementations the access point 110 may be configured to transmit the DRS at a timing and/or frequency that improves the coexistence of the primary RAT system 100 and the competing RAT system 190 depicted in FIG. 2.

Although a transmission timing similar to the timing depicted in FIG. 5 may improve coexistence with a competing RAT system such as competing RAT system 190, the access terminal 120 does not receive a clear indication of the subframe timing of the access point 110.

As discussed previously, some techniques call for PSS and SSS transmissions sequences at regular 10 millisecond intervals. The access terminal 120 can ascertain the subframe timing of the access point 110 by determining the relative timings of the PSS and SSS. Returning to the example timing of FIG. 5, it will be understood that the DRS transmissions 550, 551, 553, 560, 562, and 563 (which may include the PSS and/or the SSS) are received at irregular intervals. In particular, the interval between the beginning of the DRS transmission 550 and the beginning of the DRS transmission 551 is eight milliseconds, the next interval (between the beginnings of DRS transmissions 551 and 553) is twenty milliseconds, the next interval (between the beginnings of DRS transmissions 553 and 560) is fourteen milliseconds, etc. Because the DRS transmissions 550, 551, 553, 560, 562, and 563 are received at irregular intervals, new solutions are needed for indicating to the access terminal 120 a subframe timing of the access point 110.

As will be described in more detail below, the access point 110 may communicate the subframe timing to the access terminal 120 using a PBCH payload, a PBCH redundancy version, a SSS signature sequence, and/or CRS scrambling.

Figure 6:
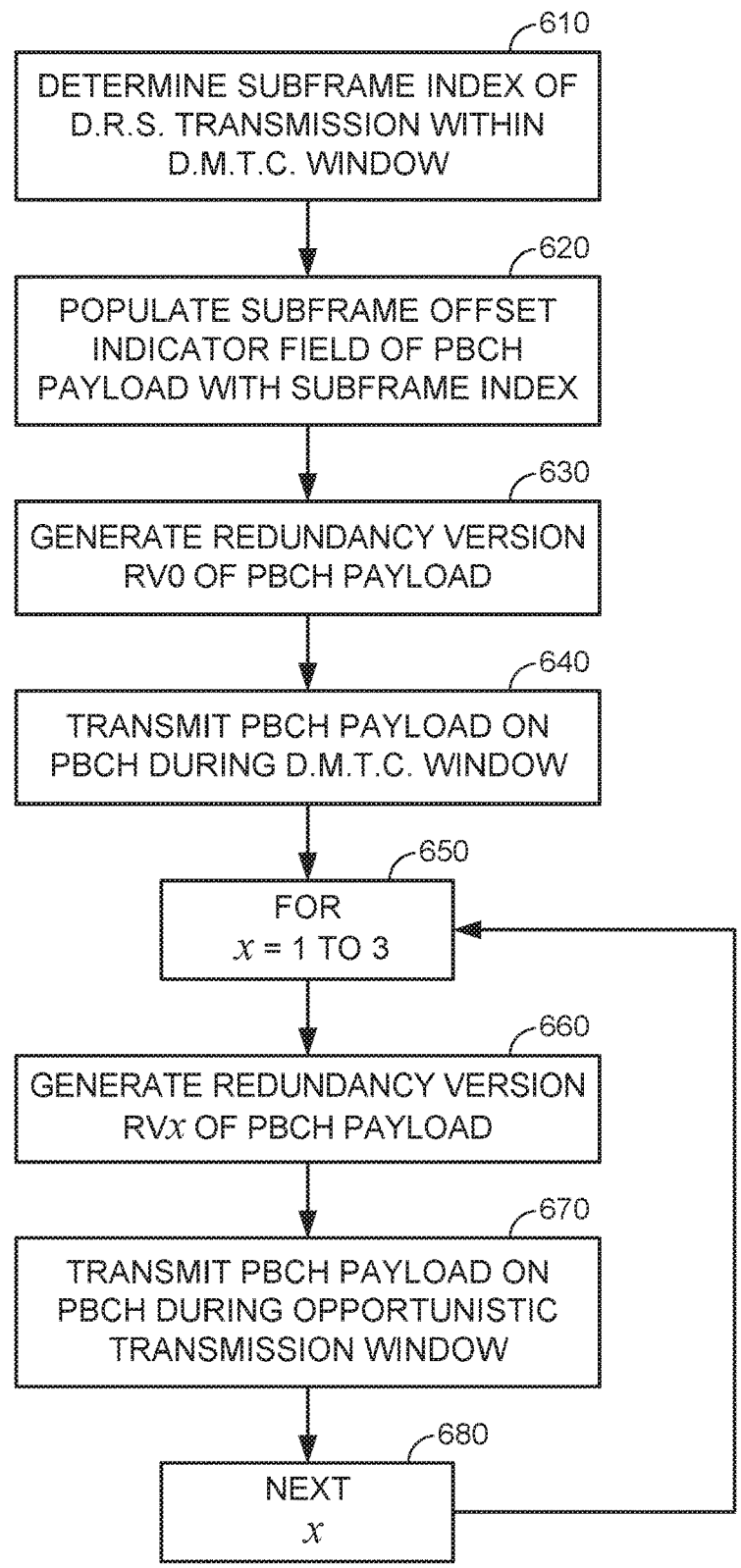
FIG. 6 generally illustrates a signal flow diagram for indicating a subframe timing using a PBCH payload in accordance with an aspect of the disclosure.

FIG. 6 generally illustrates a flow diagram for indicating a subframe timing using a PBCH payload in accordance with an aspect of the disclosure. The acts depicted in FIG. 6 may be performed by an access point (for example, the access point 110 depicted in FIGS. 1A-1B) and FIG. 6 will be described as if it is performed by the access point 110.

At 610, the access point 110 determines a subframe index of a DRS transmission within a DMTC window. As discussed previously, the DRS transmission may be transmitted within one subframe (one millisecond), but the DMTC window may have a duration of, for example, five subframes (five milliseconds). The access point 110 contends for access during each subframe included in the DMTC window, and transmits the DRS in the subframe in which contention is successful. The subframe in which contention is successful may be identified using a subframe index. For example, if contention in the first subframe is successful, then the subframe index may be '0', if contention in the second subframe is successful, then the subframe index may be '1', if contention in the third subframe is successful, then the subframe index may be '2', etc.

At 620, the access point 110 populates a subframe offset indicator field of the PBCH payload with the subframe index of the DRS transmission determined at 610. In accordance with an aspect of the disclosure, the location of the subframe offset indicator field within the PBCH payload is predetermined and the access terminal 120 is configured to recognize the presence and location of the subframe offset indicator field within the PBCH payload.

As discussed previously, the DMTC window may have a duration of, for example, five subframes. It will be understood that the subframe offset indicator field must include at least three bits in order to precisely identify the subframe index of the DRS transmission. It will be further understood that if the DMTC window has a duration of four or fewer subframes, then the subframe offset indicator field need include two or fewer bits, and that is the DMTC window has a duration of nine or more subframes, then the subframe offset indicator field need include four or more bits.

At 630, the access point 110 generates a redundancy version RV0 of the PBCH payload, and at 640, the access point 110 transmits the PBCH payload on the PBCH during the DMTC window. As discussed previously, the subframe within the DMTC window during which the PBCH payload is transmitted has been determined at 610 and indicated in the subframe offset indicator field at 620. The DMTC window in which the PBCH payload is transmitted at 640 may be similar to the DMTC window 510 or the DMTC window 520 depicted in FIG. 5, and the PBCH payload may be transmitted in a DRS transmission similar to the DRS transmission 550 or the DRS transmission 560 depicted in FIG. 5.

At 650, the access point 110 begins generation of redundancy versions RV1, RV2, and RV3. In FIG. 6, generation of redundancy versions RV1, RV2, and RV3 is depicted as a FOR-NEXT loop beginning at 650 and looping back as described below.

At 660, the access point 110 generates a redundancy version RVx of the PBCH payload, wherein x is set to 1, 2, or 3, and at 670, the access point 110 transmits the PBCH payload on the PBCH during an opportunistic transmission window. The opportunistic transmission window in which the PBCH payload is transmitted at 670 may be similar to the opportunistic transmission windows 511, 512, 513, 521, 522, or 523 depicted in FIG. 5, and the PBCH payload may be transmitted in a DRS transmission similar to the DRS transmissions 551, 553, 562, or 563 depicted in FIG. 5.

At 680, the access point 110 loops back to 650 to generate the next redundancy version. It will be understood that x=1 during the first iteration of the loop, x=2 during the second iteration of the loop, x=3 during the third iteration of the loop, and that the FOR-NEXT loop beginning at 650 terminates after the third iteration.

Figure 7:
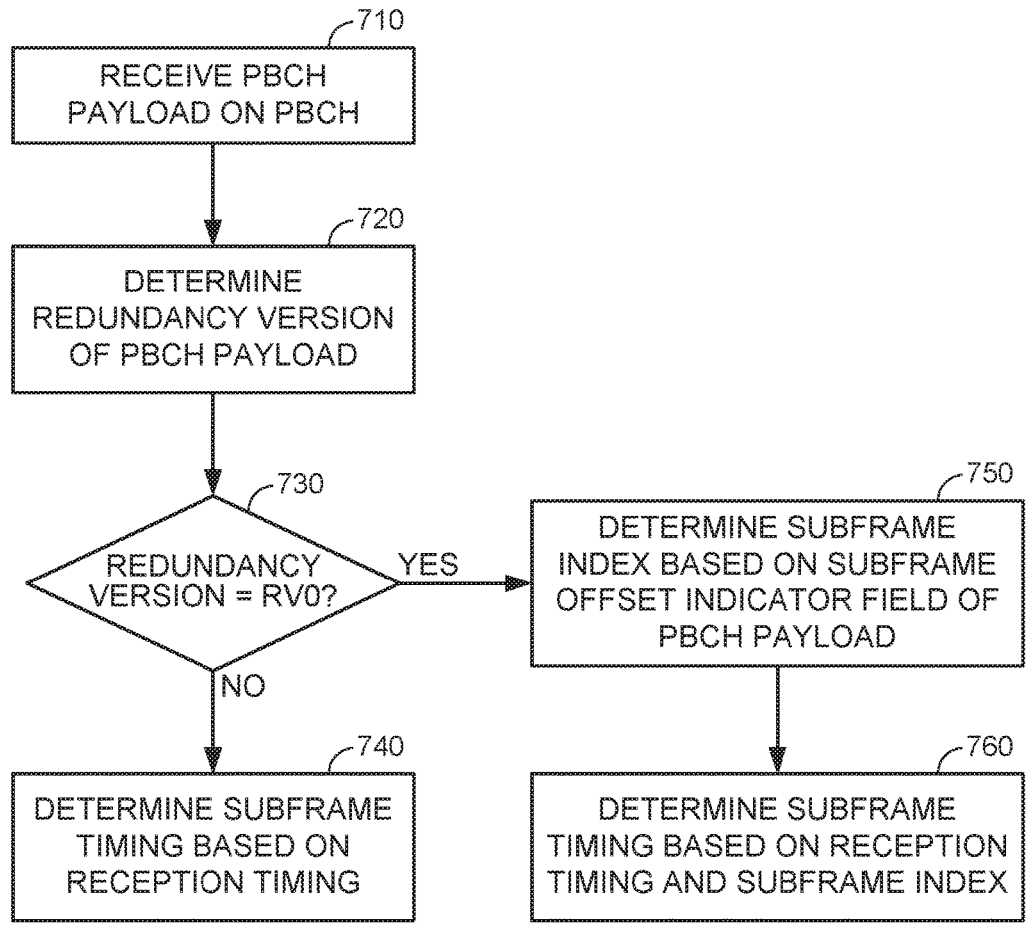
FIG. 7 generally illustrates a flow diagram for determining a subframe timing based on a PBCH payload in accordance with another aspect of the disclosure.

FIG. 7 generally illustrates a signal flow diagram for determining a subframe timing based on a PBCH payload in accordance with another aspect of the disclosure. The acts depicted in FIG. 7 may be performed by an access terminal (for example, the access terminal 120 depicted in FIGS. 1A-1B) and FIG. 7 will be described as if it is performed by the access terminal 120.

At 710, the access terminal 120 receives a PBCH payload on the PBCH. The PBCH payload may be received in a DRS transmission analogous to the DRS transmissions 550, 551, 553, 560, 562, and 563 depicted in FIG. 5. Moreover, the DRS received at 710 may be transmitted by the access point 110 at 640 or 670 as depicted in FIG. 6.

At 720, the access terminal 120 determines a redundancy version of the PBCH payload. At 730, the access terminal 120 determines whether the redundancy version of the PBCH payload is RV0. As discussed previously in the description of FIG. 6, a DRS transmission occurring within a DMTC window may have a redundancy version of RV0, whereas a DRS transmission occurring within an opportunistic transmission window may have a redundancy version of RV1, RV2, or RV3.

If the access terminal 120 determines that the redundancy version of the PBCH payload is not RV0 ('no' at 730 of FIG. 7), then at 740, the access terminal 120 determines a subframe timing of the access point 110 based on the reception timing of the DRS transmission.

For example, the opportunistic transmission windows 511, 512, 513, 521, 522, and 523 depicted in FIG. 5 each have a duration of one subframe (one millisecond) and each occur in the first subframe (SF0) of a system frame. Accordingly, if the access terminal 120 determines that the redundancy version of the PBCH payload is not RV0, the then access terminal 120 can ascertain that the DRS transmission was received during an opportunistic transmission window located in a first subframe (SF0) of a system frame (analogous to one of the opportunistic transmission windows 511, 512, 513, 521, 522, and 523 depicted in FIG. 5). As a result, the access terminal 120 can determine the subframe timing of the access point 110 based on the reception timing of the DRS transmission.

If the access terminal 120 determines that the redundancy version of the PBCH payload is RV0 ('yes' at 730 of FIG. 7), then at 750, the access terminal 120 determines a subframe index based on the subframe offset indicator field of the PBCH payload. As discussed previously, a DMTC window may have a duration that is greater than the duration of the DRS transmission (for example, five subframes as compared to one subframe). As a result, a DRS transmission that occurs during the DMTC window cannot be traced to a precise subframe timing. If the access terminal 120 receives a DRS transmission having a redundancy version of RV0, then the access terminal 120 can ascertain must determine the subframe index of the DRS transmission before precisely ascertaining a subframe timing of the access point 110. As discussed previously, if the DMTC window has a duration of five subframes, then the subframe index may be between '0' and '4' (inclusive).

At 760, the access terminal 120 determines a subframe timing of the access point 110 based on the reception timing of the DRS transmission received at 710 and the subframe index determined at 750. In particular, the access terminal 120 may determine that the subframe of the DMTC window in which the DRS transmission was received is equal to the value of the subframe index determined at 750. For example, if the subframe index is '0', then the access terminal 120 may determine that the DRS transmission was received in a first subframe (SF0) of a system frame, if the subframe index is '1', then the access terminal 120 may determine that the DRS transmission was received in a second subframe (SF1) of a system frame, if the subframe index is '2', then the access terminal 120 may determine that the DRS transmission was received in a third subframe (SF2) of a system frame, etc. As a result, the access terminal 120 can determine the subframe timing of the access point 110 based on the reception timing of the DRS transmission and the subframe index determined at 750.

It will be understood that the PBCH payload may be identical such that combining gains can be realized at the access terminal 120. Therefore, the PBCH payload may include the subframe offset indicator field regardless of whether it is transmitted during a DMTC window or during an opportunistic transmission window. However, the access terminal 120 may ignore the subframe offset indicator field unless it determines (as at 730) that the redundancy version of the PBCH payload is RV0.

Figure 8:
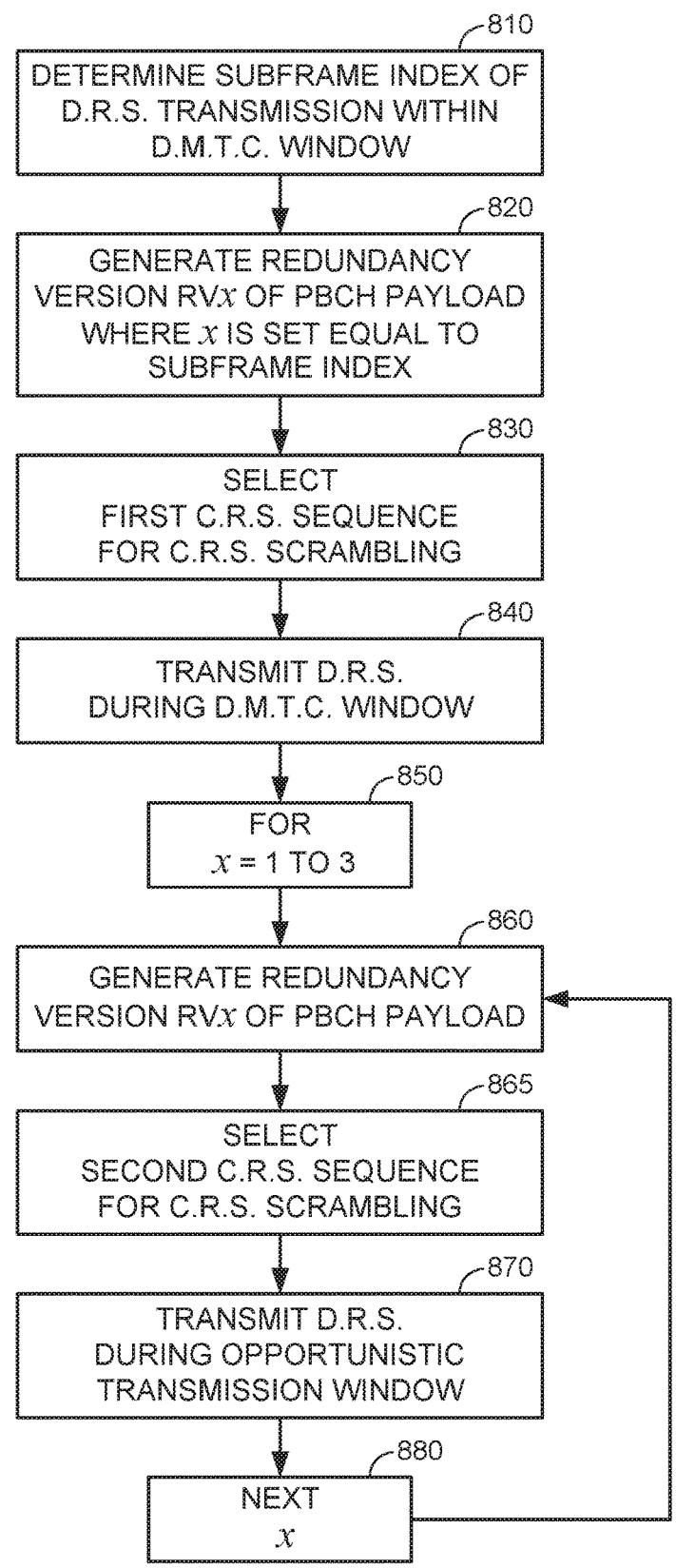
FIG. 8 generally illustrates a flow diagram for indicating a subframe timing using a PBCH redundancy version in tandem with a CRS scrambling code in accordance with another aspect of the disclosure.

FIG. 8 generally illustrates a signal flow diagram for indicating a subframe timing using a PBCH redundancy version in tandem with a CRS scrambling code in accordance with another aspect of the disclosure. The acts depicted in FIG. 8 may be performed by an access point (for example, the access point 110 depicted in FIGS. 1A-1B) and FIG. 8 will be described as if it is performed by the access point 110.

At 810, the access point 110 determines a subframe index of a DRS transmission within a DMTC window. The determination at 810 may be similar to the determination at 610, as discussed previously.

At 820, the access point 110 generates a redundancy version RVx of the PBCH payload, where x is set equal to the subframe index determined at 810. For example, if the subframe index is determined to be '0', then the access point 110 generates (at 820) a redundancy version RV0 of the PBCH payload, if the subframe index is determined to be '1', then the access point 110 generates (at 820) a redundancy version RV1 of the PBCH payload, if the subframe index is determined to be '2', then the access point 110 generates (at 820) a redundancy version RV2 of the PBCH payload, etc. It will be understood that for a DMTC window having a duration of five subframes, five redundancy versions RV0, RV1, RV2, RV3, and RV4 will be necessary.

At 830, the access point 110 selects a first CRS sequence for CRS scrambling. As discussed previously, some CRS sequences are based on a cell identifier associated with the access point transmitting the CRS. It will be understood that in accordance with an aspect of the disclosure, a single access point such as access point 110 may be configured to transmit the CRS in accordance with either a first CRS sequence or a second CRS sequence, wherein the second CRS sequence differs from the first CRS sequence with respect to a particular symbol value or scrambling code for each of the plurality of reference symbols, a specific spacing between adjacent reference symbols in the time or frequency domain, and/or a frequency shift of the plurality of reference symbols relative to a predetermined frequency.

At 840, the access point 110 transmits the DRS during the DMTC window. The DRS may include the PBCH payload generated at 820 and a CRS that is scrambled in accordance with the first CRS sequence selected at 830.

At 850, the access point 110 begins generation of redundancy versions RV1, RV2, and RV3. In FIG. 8, generation of redundancy versions RV1, RV2, and RV3 is depicted as a FOR-NEXT loop beginning at 850 and looping back as described below.

At 860, the access point 110 generates a redundancy version RVx of the PBCH payload, wherein x is set to 1, 2, or 3, and at 865, the access point 110 selects the second CRS sequence for CRS scrambling. As discussed previously, the second CRS sequence selected at 870 differs from the first CRS sequence selected at 830 with respect to a particular symbol value or scrambling code for each of the plurality of reference symbols, a specific spacing between adjacent reference symbols in the time or frequency domain, and/or a frequency shift of the plurality of reference symbols relative to a predetermined frequency.

At 870, the access point 110 transmits the DRS during an opportunistic transmission window. The DRS may include the PBCH payload generated at 860 and a CRS that is scrambled in accordance with the second CRS sequence selected at 870. The opportunistic transmission window in which the PBCH payload is transmitted at 870 may be similar to the opportunistic transmission windows 511, 512, 513, 521, 522, or 523 depicted in FIG. 5, and the PBCH payload may be transmitted in a DRS transmission similar to the DRS transmissions 551, 553, 562, or 563 depicted in FIG. 5.

At 880, the access point 110 loops back to 850 to generate the next redundancy version. It will be understood that x=1 during the first iteration of the loop, x=2 during the second iteration of the loop, x=3 during the third iteration of the loop, and that the FOR-NEXT loop beginning at 650 terminates after the third iteration.

Figure 9:
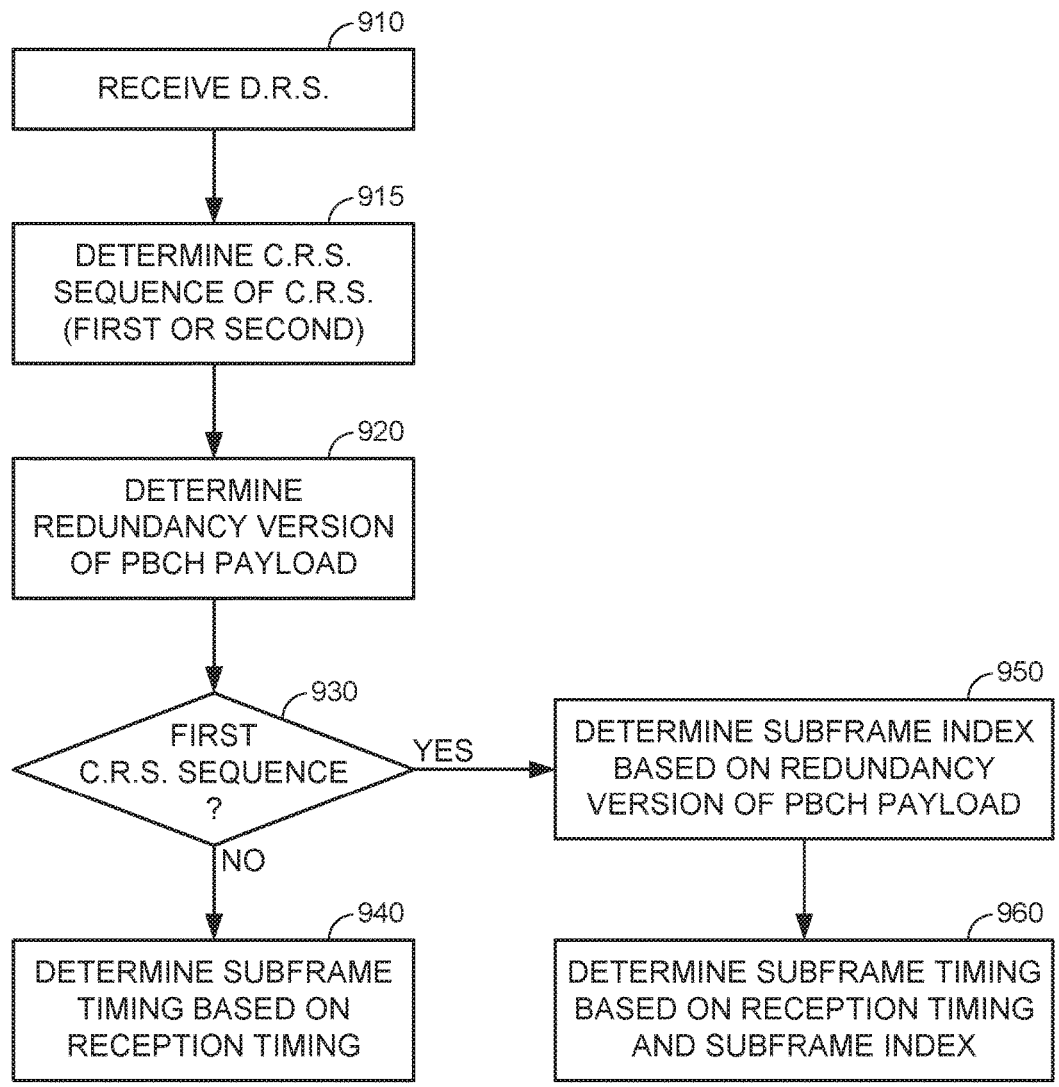
FIG. 9 generally illustrates a signal flow diagram for determining a subframe timing based on a PBCH redundancy version in tandem with a CRS scrambling code in accordance with another aspect of the disclosure.

FIG. 9 generally illustrates a signal flow diagram for determining a subframe timing based on a PBCH redundancy version in tandem with a CRS scrambling code in accordance with another aspect of the disclosure. The acts depicted in FIG. 9 may be performed by an access terminal (for example, the access terminal 120 depicted in FIGS. 1A-1B) and FIG. 9 will be described as if it is performed by the access terminal 120.

At 910, the access terminal 120 receives a DRS transmission. The DRS transmission may be analogous to the DRS transmissions 550, 551, 553, 560, 562, and 563 depicted in FIG. 5. Moreover, the DRS received at 910 may be transmitted by the access point 110 at 840 or 870 as depicted in FIG. 8.

At 915, the access terminal 120 determines a CRS sequence of the CRS, for example, the CRS included in the DRS transmission received at 910. As discussed above, the access point from which the DRS transmission is received at 910 (for example, the access point 110) may be configured to transmit the CRS in accordance with either a first CRS sequence or a second CRS sequence, wherein the second CRS sequence differs from the first CRS sequence with respect to a particular symbol value or scrambling code for each of the plurality of reference symbols, a specific spacing between adjacent reference symbols in the time or frequency domain, and/or a frequency shift of the plurality of reference symbols relative to a predetermined frequency.

At 920, the access terminal 120 determines a redundancy version of the PBCH payload, for example, the PBCH payload included in the DRS transmission received at 910.

At 930, the access terminal 120 determines whether the CRS sequence determined at 915 is the first CRS sequence. As discussed previously in the description of FIG. 6, a DRS transmission occurring within a DMTC window may use the first CRS sequence, whereas a DRS transmission occurring within an opportunistic transmission window may use the second CRS sequence.

If the access terminal 120 determines that the first CRS sequence is not used in the DRS received at 910 ('no' at 930 of FIG. 9), then at 940, the access terminal 120 determines a subframe timing of the access point 110 based on the reception timing of the DRS transmission.

For example, the opportunistic transmission windows 511, 512, 513, 521, 522, and 523 depicted in FIG. 5 each have a duration of one subframe (one millisecond) and each occur in the first subframe (SF0) of a system frame. Accordingly, if the access terminal 120 determines that the first CRS sequence is not used, the then access terminal 120 can ascertain that the DRS transmission was received during an opportunistic transmission window located in a first subframe (SF0) of a system frame (analogous to one of the opportunistic transmission windows 511, 512, 513, 521, 522, and 523 depicted in FIG. 5). As a result, the access terminal 120 can determine the subframe timing of the access point 110 based on the reception timing of the DRS transmission.

If the access terminal 120 determines that the first CRS sequence is used in the DRS received at 910 ('yes' at 930 of FIG. 9), then at 750, the access terminal 120 determines a subframe index based on the redundancy version of the PBCH payload. In particular, if redundancy version RV0 is transmitted, then the access terminal 120 may determine that the subframe index is '0', if redundancy version RV1 is transmitted, then the access terminal 120 may determine that the subframe index is '1', if redundancy version RV2 is transmitted, then the access terminal 120 may determine that the subframe index is '2', etc. As discussed previously, if the DMTC window has a duration of five subframes, then five redundancy versions may be necessary to precisely indicate the subframe index. The subframe index may be between '0' and '4' (inclusive).

At 960, the access terminal 120 determines a subframe timing of the access point 110 based on the reception timing of the DRS transmission received at 910 and the subframe index determined at 950. In particular, the access terminal 120 may determine that the subframe of the DMTC window in which the DRS transmission was received is equal to the value of the subframe index determined at 950. For example, if the subframe index is '0', then the access terminal 120 may determine that the DRS transmission was received in a first subframe (SF0) of a system frame, if the subframe index is '1', then the access terminal 120 may determine that the DRS transmission was received in a second subframe (SF1) of a system frame, if the subframe index is '2', then the access terminal 120 may determine that the DRS transmission was received in a third subframe (SF2) of a system frame, etc. As a result, the access terminal 120 can determine the subframe timing of the access point 110 based on the reception timing of the DRS transmission and the subframe index determined at 950.

As discussed previously with respect to FIGS. 8-9, the access point 110 may indicate a subframe timing using a PBCH redundancy version in tandem with a CRS scrambling code, and the access terminal 120 may determine a subframe timing based on a PBCH redundancy version in tandem with a CRS scrambling code.

However, in accordance with other aspects of the disclosure, the access point 110 may indicate a subframe timing using a PBCH redundancy version in tandem with a SSS signature sequence (SEQ1 or SEQ2), and the access terminal 120 may determine a subframe timing based on a PBCH redundancy version in tandem with a SSS signature sequence (SEQ1 or SEQ2). Accordingly, a modification of the acts depicted in FIG. 8 may be performed by an access point (for example, the access point 110 depicted in FIGS. 1A-1B), as described in greater detail below. Moreover, a modification of the acts depicted in FIG. 9 may be performed by an access terminal (for example, the access terminal 120 depicted in FIGS. 1A-1B), as described in greater detail below.

In addition, the PBCH redundancy version may implicitly be used to indicate a number of OFDM symbols that may be used for PBCH transmission. For example, a variable number of PBCH symbols may be used wherein the PBCH that occurs within a DMTC window may use a different number of OFDM symbols for the physical PBCH channel, say 5 or 6 symbols, compared to only 4 symbols PBCH occurring outside a DMTC window. This relationship may be implicitly determined as a function of the PBCH redundancy version. For example, redundancy version number 0 may always be transmitted within a DMTC window and hence be transmitted over say, 5 or 6, OFDM symbols whereas other redundancy versions may be transmitted using fewer OFDM symbols.

For example, the access point 110 may determine a subframe index of a DRS transmission within a DMTC window and generate a redundancy version RVx of the PBCH payload, where x is set equal to the subframe index. These acts may be identical to the acts described above (at 810 and 820 of FIG. 8). However, rather than selecting from between a first CRS sequence and a second CRS sequence (as at 830 and 865, respectively, of FIG. 8) the access point 110 may select from between a first SSS signature sequence (SEQ1) or a second SSS signature sequence (SEQ2).

As noted above, the SSS signature sequences SEQ1 and SEQ2 may be used to indicate whether a particular SSS is being transmitted in SF0 or in SF5. In accordance with an aspect of the disclosure, the SSS signature sequences SEQ1 and SEQ2 are instead used to indicate whether the DRS is being transmitted in a DMTC window (analogous to DMTC windows 510 and 520 depicted in FIG. 5) or in an opportunistic transmission window (analogous to opportunistic transmission windows 511, 512, 513, 521, 522, and 523 depicted in FIG. 5). For example, SEQ1 may be selected if the DRS is being transmitted in a DMTC window and SEQ2 may be selected if the DRS is being transmitted in an opportunistic transmission window.

If the access point 110 selects from between first and second SSS signature sequences to indicate whether a DRS transmission is performed in a DMTC window or in an opportunistic transmission window (as in the modification described above), then the access terminal 120 may be configured to recognize whether a DRS transmission is performed in a DMTC window or in an opportunistic transmission window based on the SSS signature sequence if the SSS.

For example, the access terminal 120 may receive a DRS transmission. The receiving may be identical to the act described above (at 910 of FIG. 9). However, rather than determining a CRS sequence of the CRS (as at 915 of FIG. 9), the access terminal 120 may determine a SSS signature sequence of the SSS. After determining a redundancy version of the PBCH payload (as at 920 of FIG. 9), the access terminal 120 may determine whether the SSS has the first SSS signature sequence SEQ1 or the second SSS signature sequence SEQ2. If the SSS does not use the first SSS signature sequence SEQ1, then the access terminal 120 determines a subframe timing of the access point 110 based on the reception timing of the DRS transmission (as at 940 of FIG. 9). If the SSS does use the first SSS signature sequence SEQ1, then the access terminal 120 determines a subframe timing of the access point 110 based on the reception timing of the DRS transmission and a subframe index determined based on the redundancy version of the PBCH payload (as at 950 and 960 of FIG. 9).

Figure 10:
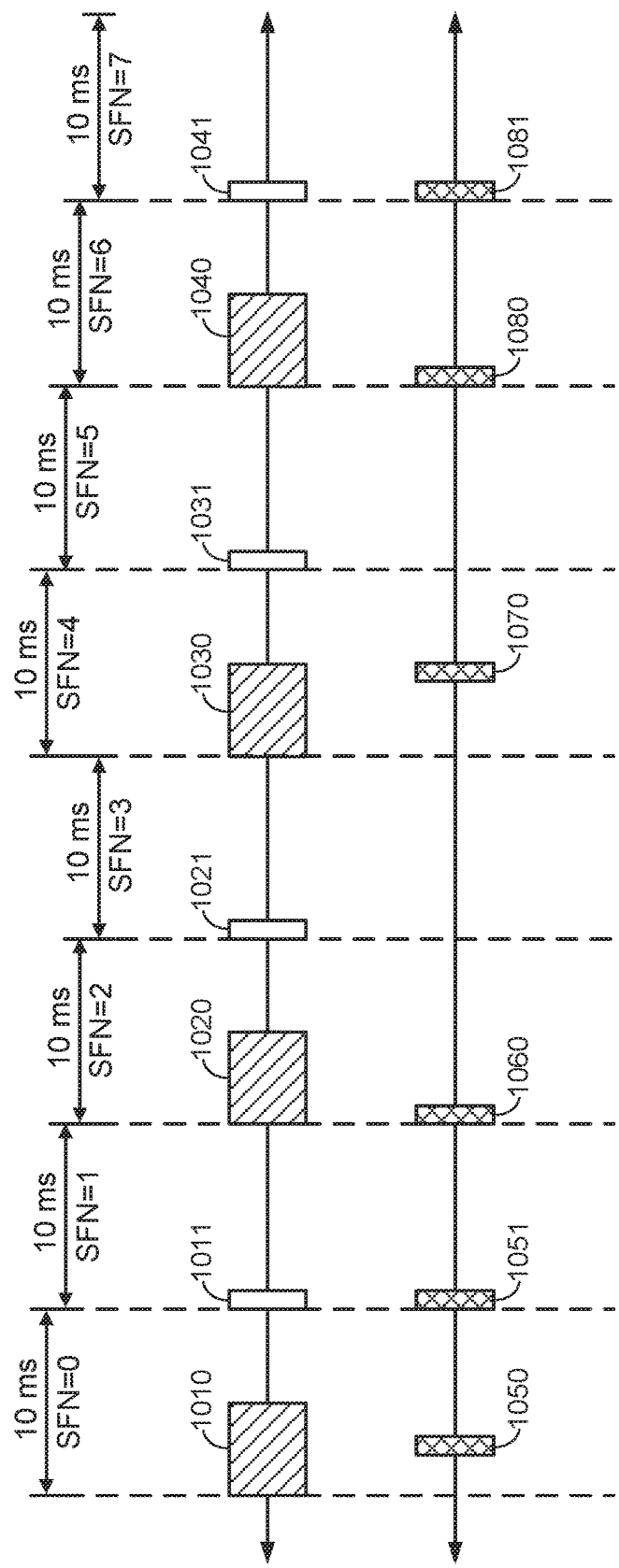
FIG. 10 generally illustrates another example DRS transmission timing.

FIG. 10 provides alternative illustrations of apparatuses for implementing the access point 110 and/or the access terminal 120 represented as a series of interrelated functional modules.

FIG. 10 illustrates an example apparatus 1000 represented as a series of interrelated functional modules. A module for determining a subframe index of a Discovery Reference Signal (DRS) transmitted within a Discovery Reference Signaling (DRS) Measurement Timing Configuration window (DMTC window 1002 may correspond at least in some aspects to, for example, a communication controller or a component thereof as discussed herein (e.g., the communication controller 114 or the communication controller 124 or the like). A module for indicating the subframe index using one or more of a Physical Broadcast Channel (PBCH) payload, a PBCH redundancy version, a Secondary Synchronization Signal (SSS) signature sequence, and/or a Cell-specific Reference Signal (CRS) scrambling code included in the DRS 1004 may correspond at least in some aspects to, for example, a communication device or a component thereof as discussed herein (e.g., the communication device 112 or the communication device 122 or the like).

The functionality of the modules of FIG. 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

FIG. 10 illustrates another example DRS transmission timing that may be implemented for the primary RAT system 100 to facilitate contention-based access to the communication medium 132. FIG. 10 depicts eight system frames having SFNs '0' through '7'. Each system frame has a duration of ten milliseconds.

As noted above, the access point 110 depicted in FIGS. 1A-1B may be configured for windowed transmission of the DRS within a DMTC window. The DRS may include one or more of the signals depicted in FIG. 3, for example, the SSS, CRS, PBCH, PDCCH, and eSIB. Transmission of the DRS may only require one millisecond (i.e., one subframe), although other timings are possible.

Each DMTC window may also have a predetermined periodicity. In the example depicted previously in FIG. 5, the predetermined periodicity of the DMTC windows 510 and 520 was 40 milliseconds (i.e., every fourth radio frame). However, FIG. 10 depicts another example having DMTC windows 1010, 1020, 1030, and 1040, in which the predetermined periodicity is 20 milliseconds.

Accordingly, the first DMTC window 1010 is depicted within the system frame having an SFN of '0', the second DMTC window 1020 is depicted within the system frame having an SFN of '2', the third DMTC window 1030 is depicted within the system frame having an SFN of '4', and the fourth DMTC window 1040 is depicted within the system frame having an SFN of '6'. Although only four DMTC windows 1010, 1020, 1030, and 1040 are shown, it will be understood that the pattern depicted in FIG. 5 may be repeated indefinitely.

FIG. 10 also depicts opportunistic transmission windows at 1011, 1021, 1031, and 1041. Each of the opportunistic transmission windows 1011, 1021, 1031, and 1041 may have a predetermined duration. As depicted in FIG. 10, the predetermined duration of each of the opportunistic transmission windows 1011, 1021, 1031, and 1041 may be, for example, one millisecond (i.e., one subframe). The predetermined duration may be known in advance by both the access point 110 and the access terminal 120. Moreover, the predetermined duration of each of the opportunistic transmission windows 1011, 1021, 1031, and 1041 may be equal to the amount of time required to perform a complete transmission of the DRS.

In some implementations, the access point 110 may be configured to transmit the DRS at a timing and/or frequency that improves the coexistence of the primary RAT system 100 and the competing RAT system 190. In accordance with an aspect of the disclosure, the access point 110 may be configured to transmit the DRS during each of the DMTC windows 1010, 1020, 1030, and 1040. However, the DRS may be transmitted at any time (i.e., at any subframe) within the DMTC windows 1010, 1020, 1030, and 1040.

For example, the access point 110 may contend for access to transmit the DRS during the first subframe of the DMTC window 1010. If the access point 110 succeeds in contending for access, then it may transmit a DRS during the first subframe of the DMTC window 1010. However, if the access point 110 does not succeed in contending for access, then it may not transmit the DRS during the first subframe of the DMTC window 1010. Instead, the access point 110 may contend for access in the second subframe, the third subframe, etc., until contention is successful. In some implementations, the access point 110 transmits the DRS in the final subframe of the DMTC window regardless of whether it has successfully contended for access.

As will be understood from FIG. 5, the access point 110 successfully contends for access during the third subframe of the DMTC window 1010, and therefore transmits a DRS transmission 1050 during the third subframe of the DMTC window 1010. It will be further understood that the access point 110 successfully contends for access during the first subframe of the DMTC window 1020 and the first subframe of the DMTC window 1040, and therefore transmits a DRS transmission 1060 and a DRS transmission 1080 during the respective first subframes of the DMTC window 1020 and the DMTC window 1040. It will be further understood that the access point 110 successfully contends for access during the fifth subframe of the DMTC window 1030, or alternatively, fails to successfully contend for access for each of the first four subframes of the DMTC window 1030. As a result, the access point 110 transmits a DRS transmission 1070 during the fifth subframe of the DMTC window 1030.

In accordance with an aspect of the disclosure, the access point 110 may be configured to attempt transmission of the DRS during each of the opportunistic transmission windows 1011, 1021, 1031, and 1041. The access point 110 will transmit a DRS during every opportunistic transmission window 1011, 1021, 1031, and 1041 in which it successfully contends for access. If the access point 110 fails to successfully contend for access during a particular opportunistic transmission window 1011, 1021, 1031, or 1041 then the access point 110 will not transmit a DRS during that particular opportunistic transmission window 1011, 1021, 1031, or 1041.

In the example depicted in FIG. 10, the access point 110 performs a DRS transmission 1051 during the opportunistic transmission window 1011 and a DRS transmission 1081 during the opportunistic transmission window 1041. As an example, the access point 110 may have successfully contended for access during the opportunistic transmission windows 1011 and 1041, but failed to successfully contend for access during the opportunistic transmission windows 1021 and 1031. Accordingly, DRS transmissions 1051 and 1081 were transmitted during the opportunistic transmission windows 1011 and 1041, respectively, but no DRS transmissions were performed during the opportunistic transmission windows 1021 and 1031.

It will be understood that the DRS transmissions 1050, 1051, 1060, 1070, 1080, and 1081 are shown solely for illustrative purposes, and that any suitable transmission pattern may be used in accordance with aspects of the present disclosure. As noted above, in some implementations the access point 110 may be configured to transmit the DRS at a timing and/or frequency that improves the coexistence of the primary RAT system 100 and the competing RAT system 190 depicted in FIG. 2.

In some implementations, the access point 110 may be configured to use the timing of FIG. 10 (in which the periodicity of the DMTC windows 1010, 1020, 1030, and 1040 is 20 milliseconds) as an alternative to the timing of FIG. 5 (in which the periodicity of the DMTC windows 510 and 520 is 40 milliseconds). Additionally or alternatively, the access point 110 may be configured to select between the timing of FIG. 5 and the timing of FIG. 10.

As noted above, when the timing of FIG. 5 is being used by the access point 110, the access point 110 may follow the flow diagram of FIG. 6 in order to indicate a subframe timing using a PBCH payload. However, if the timing of FIG. 10 is being used by the access point 110, then the access point 110 may follow the flow diagram of FIG. 11.

Alternatively, transmission of PBCH and/or transmissions of the entire DRS signal may be limited to the DMTC windows 1010, 1020, 1030, and 1040 only, thereby limiting the DRS periodicity to 20 milliseconds only and eliminating the transmission of DRS on intermediate 10 millisecond opportunities altogether. In such a scenario, the PBCH redundancy version of the transmission at 1010 would employ RV0 and the PBCH transmission at 1020 would employ RV1. In addition, the windows of transmission for each DRS opportunity may be different. For instance, the DRS transmission at 1010 may have a DMTC window length of 5 milliseconds while the transmission at 1020 may have only have a 1 millisecond interval.

Figure 11:
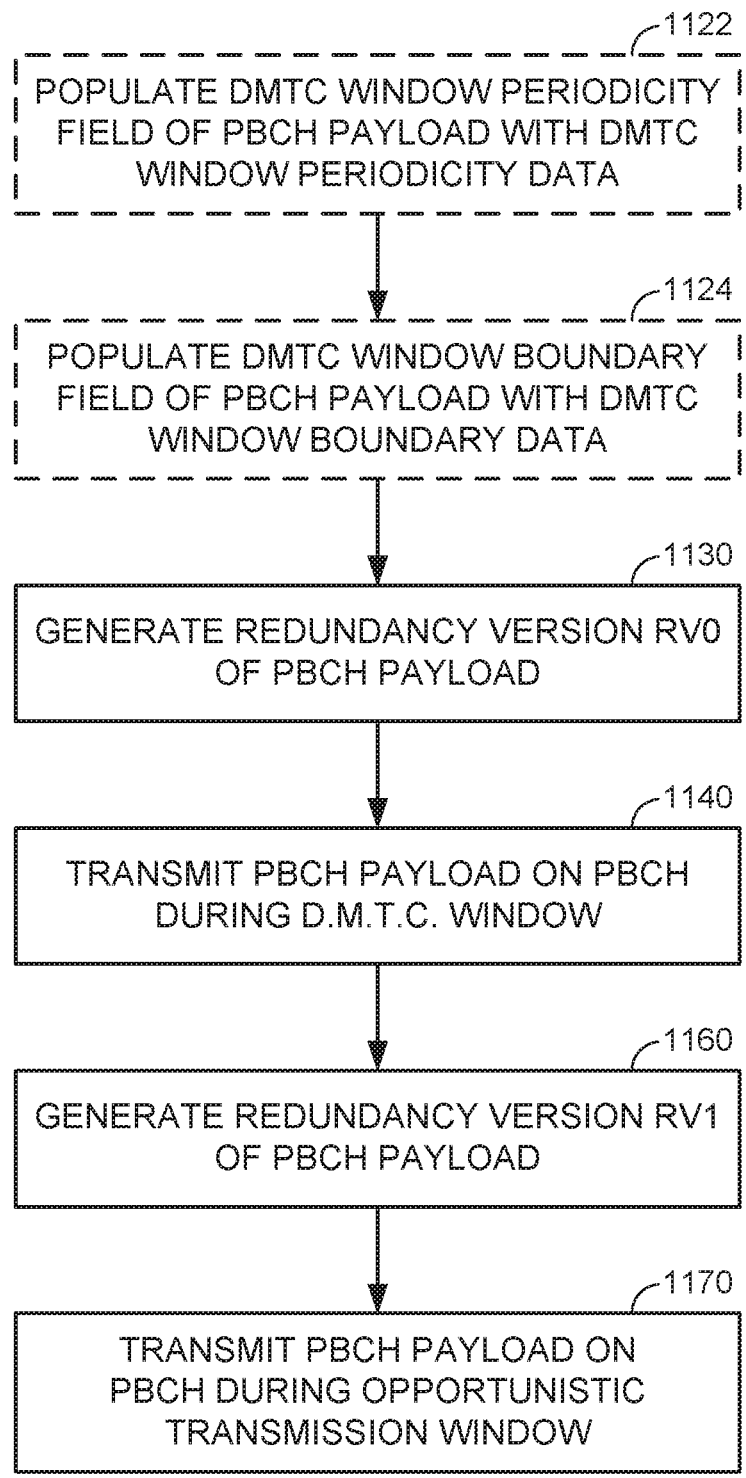
FIG. 11 generally illustrates another flow diagram for indicating a subframe timing using a PBCH payload in accordance with an aspect of the disclosure.

FIG. 11 generally illustrates a flow diagram for indicating a subframe timing using a PBCH payload in accordance with an aspect of the disclosure. The acts depicted in FIG. 11 may be performed by an access point (for example, the access point 110 depicted in FIGS. 1A-1B) and FIG. 11 will be described as if it is performed by the access point 110. In some implementations, the access point 110 may perform the flow diagram of FIG. 11 in tandem with, for example, one or more of the flow diagram of FIG. 6 and/or the flow diagram of FIG. 8.

At 1122, the access point 110 optionally populates a DMTC window periodicity field of the PBCH payload with DMTC window periodicity data. The DMTC window periodicity data may, for example, consist of one bit. The DMTC window periodicity data may indicate whether the periodicity of the DMTC window is 40 milliseconds (as in the timing of FIG. 5), or 20 milliseconds (as in the timing of FIG. 10). As an example, if the access point 110 is transmitting a DRS transmission in accordance with DMTC windows having a periodicity of 40 milliseconds, then the access point 110 may populate the DMTC window periodicity field with a value of '0', and if the access point 110 is transmitting a DRS transmission in accordance with DMTC windows having a periodicity of 20 milliseconds, then the access point 110 may populate the DMTC window periodicity field with a value of '1'.

At 1124, the access point 110 optionally populates a DMTC window boundary field of the PBCH payload with DMTC window boundary data. The DMTC window boundary data may, for example, consist of one bit. The DMTC window boundary data may indicate whether the boundary of the DMTC window is at 0 milliseconds (similar to the DMTC windows 1010 and 1030 of FIG. 10) or 20 milliseconds (similar to the DMTC windows 1020 and 1040 of FIG. 10). As an example, if the access point 110 is transmitting a DRS transmission within a DMTC window at a 0 millisecond boundary, then the access point 110 may populate the DMTC window boundary field with a value of '0', and if the access point 110 is transmitting a DRS transmission in accordance with DMTC windows having a periodicity of 20 milliseconds, then the access point 110 may populate the DMTC window boundary field with a value of '1'.

Additionally or alternatively, the DMTC window boundary data may indicate whether a particular DMTC window is within a first subset of subframes (subframes with SFN={0, 4, 8, 12, etc.}) or a second subset of subframes (subframes with SFN={2, 6, 10, 14, etc.}). As an example, if the access point 110 is transmitting a DRS transmission within a DMTC window in SFN0, SFN4, SFN8, SFN12, etc., then the access point 110 may populate the DMTC window boundary field with a value of '0', and if the access point 110 is transmitting a DRS transmission within a DMTC window in SFN2, SFN6, SFN10, SFN14, etc., then, then the access point 110 may populate the DMTC window boundary field with a value of '1'.

As will be understood from FIG. 11, the access point 110 may perform the populating at 1122, the populating at 1124, or any combination thereof. It will be understood that in scenarios where the populating at 1124 is performed, the DMTC window boundary field of the PBCH payload may be repopulated every time a new PBCH payload is generated.

At 1130, the access point 110 generates a redundancy version RV0 of the PBCH payload, and at 1140, the access point 110 transmits the PBCH payload (having redundancy version RV0) on the PBCH during the DMTC window. The DMTC window in which the PBCH payload is transmitted at 1130 may be similar to the DMTC window 1010, 1020, 1030, or 1040 depicted in FIG. 10, and the PBCH payload may be transmitted in a DRS transmission similar to the DRS transmissions 1050, 1060, 1070, and 1080 depicted in FIG. 10. In some respects, the generating at 1130 and the transmitting at 1140 may be similar to the generating at 630 and the transmitting at 640 depicted in FIG. 6. For brevity, the description of the generating at 630 and the transmitting at 640 will not be repeated here.

At 1160, the access point 110 generates a redundancy version RV1 of the PBCH payload, and at 1170, the access point 110 transmits the PBCH payload (having redundancy version RV1) on the PBCH during an opportunistic transmission window. The opportunistic transmission window in which the PBCH payload is transmitted at 1170 may be similar to the opportunistic transmission windows 1011, 1021, 1031, and 1041 depicted in FIG. 10, and the PBCH payload may be transmitted in a DRS transmission similar to the DRS transmissions 1051 or 1081 depicted in FIG. 10. In some respects, the generating at 1160 and the transmitting at 1170 may be similar to the generating at 660 and the transmitting at 670 depicted in FIG. 6. For brevity, the description of the generating at 630 and the transmitting at 640 will not be repeated here.

As noted above, the flow diagram of FIG. 11 only depicts the generation of two different redundancy versions RV0 and RV1 (unlike the flow diagram of FIG. 6, in which the access point 110 generates four different redundancy versions RV0, RV1, RV2, and RV3). It will be understood that the FOR-NEXT loop depicted in FIG. 6 (in which x=1 to 3) is therefore omitted from FIG. 11 because redundancy version RV2 and RV3 of the PBCH are not generated.

Figure 12:
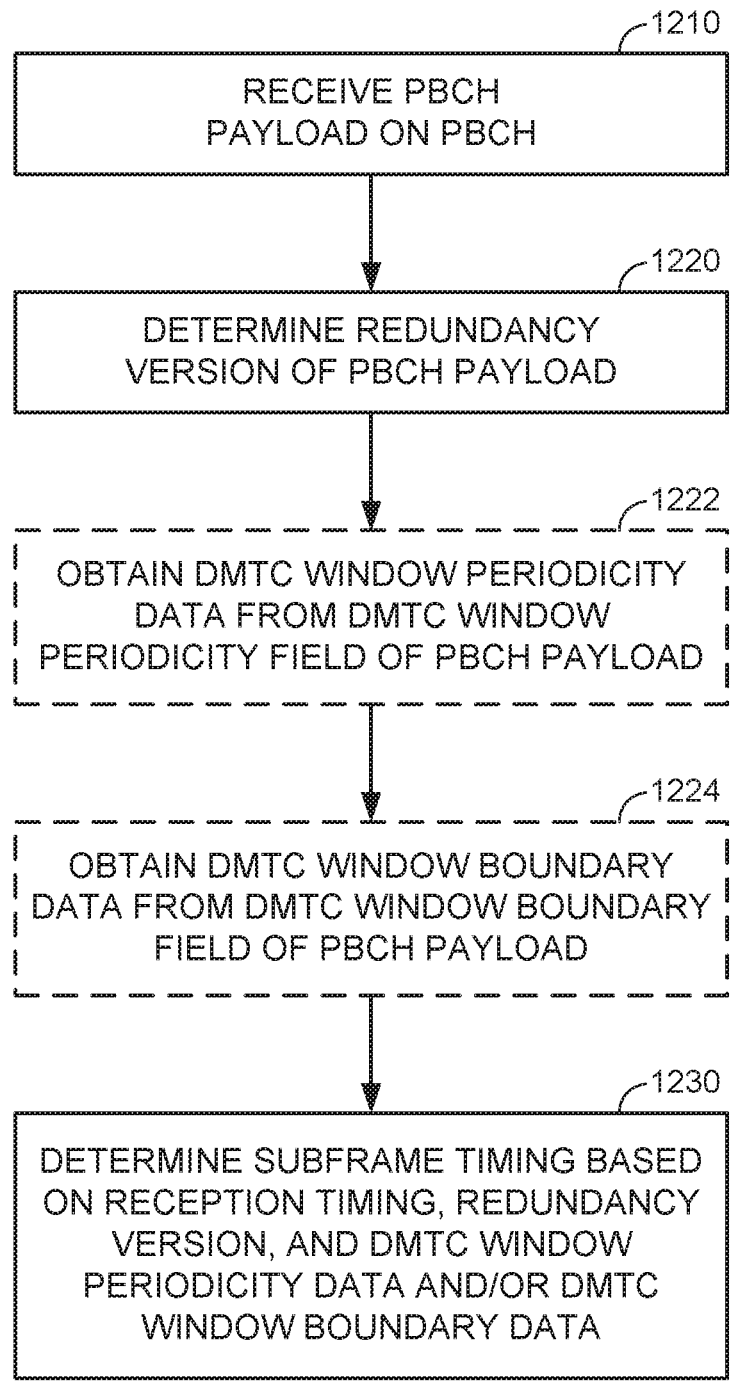
FIG. 12 generally illustrates a flow diagram for determining a subframe timing based on a PBCH payload in accordance with another aspect of the disclosure.

FIG. 12 generally illustrates a signal flow diagram for determining a subframe timing based on a PBCH payload in accordance with another aspect of the disclosure. The acts depicted in FIG. 12 may be performed by an access terminal (for example, the access terminal 120 depicted in FIGS. 1A-1B) and FIG. 12 will be described as if it is performed by the access terminal 120.

At 1210, the access terminal 120 receives a PBCH payload on the PBCH. The PBCH payload may be received in a DRS transmission analogous to any of the DRS transmissions 550, 551, 553, 560, 562, or 563 depicted in FIG. 5 or any of the DRS transmissions 1050, 1051, 1060, 1070, 1080, or 1081 depicted in FIG. 10.

At 1220, the access terminal 120 determines a redundancy version of the PBCH payload received at 1210. At 1222, the access terminal 120 optionally obtains DMTC window periodicity data from a DMTC window periodicity field of the PBCH payload received at 1210. At 1224, the access terminal 120 optionally obtains DMTC window boundary data from a DMTC window boundary field of the PBCH payload received at 1210.

At 1230, the access terminal 120 determines a subframe timing of the access point 110 based on the reception timing of the DRS transmission received at 1210, the redundancy version determined at 1220, and the DMTC window periodicity data and/or DMTC boundary data obtained at 1222 and/or 1224.

As an example, the access terminal 120 may determine that the redundancy version of the PBCH payload is RV0 and conclude that the DRS transmission was received during a DMTC window. The access terminal 120 may further determine, based on DMTC window periodicity data obtained at 1222, that the periodicity of the DMTC window is 40 milliseconds (as in the timing depicted in FIG. 5). The access terminal 120 may therefore determine the system timing of the access point 110 based on the reception timing of the PBCH payload and a subframe index (as depicted in FIG. 7). Additionally or alternatively, the access terminal 120 may therefore determine the system timing of the access point 110 based on the reception timing of the PBCH payload and a CRS sequence (as depicted in FIG. 9).

As another example, the access terminal 120 may once again determine that the redundancy version of the PBCH payload is RV0 and conclude that the DRS transmission was received during a DMTC window. The access terminal 120 may further determine, based on DMTC window periodicity data obtained at 1222, that the periodicity of the DMTC window is 20 milliseconds (as in the timing depicted in FIG. 10). In this example, the access terminal 120 may partially determine the system timing of the access point 110 based on the reception timing of the PBCH payload and a subframe index (as depicted in FIG. 7), or based on the reception timing of the PBCH payload and a CRS sequence (as depicted in FIG. 9). However, based on this information alone, the access terminal 120 may not be able to determine whether the PBCH payload was received at a 0 millisecond boundary (similar to the DMTC window 1010 or the DMTC window 1030 of FIG. 10) or at a 20 millisecond boundary (similar to the DMTC window 1020 or the DMTC window 1040 of FIG. 10). Accordingly, the access terminal 120 may determine the system timing based further on the DMTC window boundary data obtained at 1224, which would indicate whether the DRS transmission was sent by the access point 110 at the 0 millisecond boundary or the 20 millisecond boundary.

Figure 13:
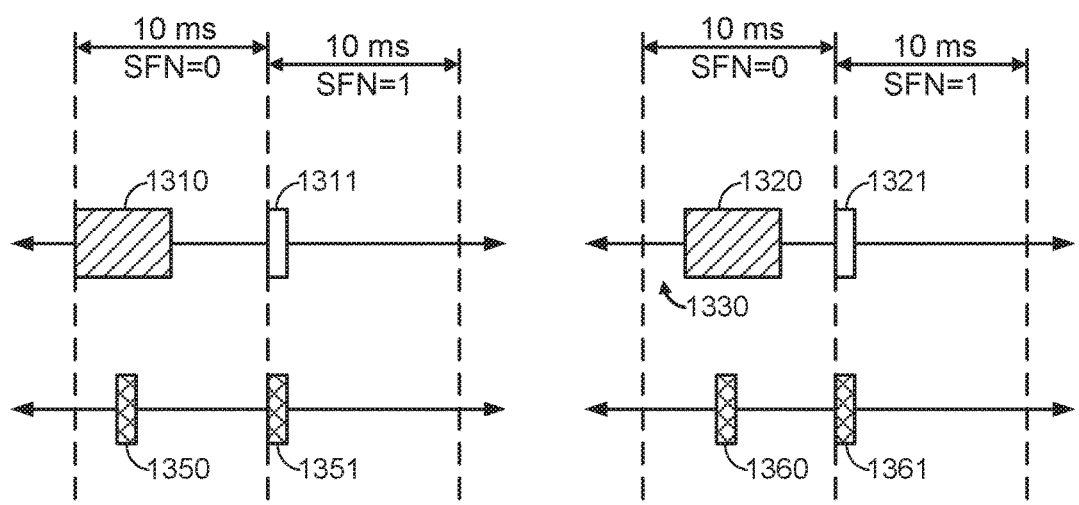
FIG. 13 generally illustrates a variation of the example DRS transmission timing of FIG. 5 and FIG. 10.

FIG. 13 generally illustrates another example DRS transmission timing that may be implemented for the primary RAT system 100 to facilitate contention-based access to the communication medium 132. FIG. 13 depicts a first variation of the DMTC window timing (on the left) and a second variation of the DMTC window timing (on the right).

In the first variation, a DMTC window 1310 and an opportunistic transmission window 1311 are depicted. Also depicted are a DRS transmission 1350 transmitted during the DMTC window 1310 and a DRS transmission 1351 transmitted during the opportunistic transmission window 1311. In the first variation, the DMTC window 1310 is located within a single subframe (for example, SFN0, as depicted in FIG. 13) and the beginning of the DMTC window 1310 is coincident with the beginning of the system frame. In other words, subframe 0 of a particular system frame is the first subframe of the DMTC window 1310. In this respect, the first variation shown on the left of FIG. 13 is similar to the DMTC window timing depicted in FIGS. 5 and 10.

In the second variation, a DMTC window 1320 and an opportunistic transmission window 1321 are depicted. Also depicted are a DRS transmission 1360 transmitted during the DMTC window 1320 and a DRS transmission 1361 transmitted during the opportunistic transmission window 1321. In the second variation, the DMTC window 1320 is again located within a single subframe (for example, SFN0, as depicted in FIG. 13). However, unlike in the first variation, the beginning of the DMTC window 1320 is not coincident with the beginning of the system frame. In other words, subframe 0 of a particular system frame is not the first subframe of the DMTC window 1320. Instead, some other subframe of the system frame is the first subframe of the DMTC window 1320.

The DMTC window timing may be described as having a DMTC window subframe offset. For example, in the first variation, the DMTC window subframe offset may have a value of zero because subframe 0 is the first subframe of the DMTC window 1310. However, in the second variation, the DMTC window subframe offset may have a value that is greater than zero because a subframe other than subframe 0 is the first subframe of the DMTC window 1320. In FIG. 13 (on the right), the DMTC window subframe offset is labeled as DMTC window subframe offset 1330. As an example, subframe 2 may be the first subframe of the DMTC window 1320, in which case the value of the DMTC window subframe offset 1330 would be two.

In some implementations, the access point 110 and access terminal 120 may be configured to assume a DMTC window subframe offset 1330 equal to zero. However, in other implementations, the DMTC window subframe offset 1330 may be selected by the access point 110 and communicated to the access terminal 120 using the PBCH payload or some other signal.

Returning to FIG. 6, it will be recalled that at 610, the access point 110 determines a subframe index of a DRS transmission within a DMTC window at 620, the access point 110 populates a subframe offset indicator field of the PBCH payload with the subframe index of the DRS transmission determined at 610.

Moreover, returning to FIG. 8, it will be recalled that at 810, the access point 110 determines a subframe index of a DRS transmission within a DMTC window, and at 820, the access point 110 generates a redundancy version RVx of the PBCH payload, where x is set equal to the subframe index determined at 810.

Because FIG. 6 and FIG. 8 both assume the first variation of the DMTC window timing (depicted on the left of FIG. 13), in which the beginning of the system frame and the beginning of the DMTC window 1310 are coincident, the subframe index determined at 610 or 810 will have the same value regardless of whether the subframe index is calculated as a relative distance from the beginning of the system frame or the beginning of the DMTC window.

On the other hand, if the DMTC window subframe offset 1330 is greater than zero (depicted on the right in FIG. 13), then the beginning of the system frame and the beginning of the DMTC window are not coincident, and the subframe index determined at 610 or 810 will have a different value depending on whether the subframe index is calculated as a relative distance from the beginning of the system frame or calculated as a relative distance the beginning of the DMTC window 1320.

In some implementations, the access point 110 and access terminal 120 may be configured to measure the subframe index of the DRS transmission as a relative distance from the beginning of the DMTC window. For example, if the DMTC window begins in subframe 1, and the subframe index of the DRS transmission is 2, then the access terminal 120 may determine that the DRS transmission was transmitted by the access point 110 during subframe 3.

In other implementations, the access point 110 and access terminal 120 may be configured to measure the subframe index of the DRS transmission as a relative distance from the beginning of the system frame. For example, if the DMTC window begins in subframe 1, and the subframe index of the DRS transmission is 2, then the access terminal 120 may determine that the DRS transmission was transmitted by the access point 110 during subframe 2.

As will be understood from the foregoing, an access point such as the access point 110 may be configured to perform a method of transmitting a DRS comprising establishing a transmission timing for transmission of the DRS relative to a system timing of the access point 110. The system timing may include system frames and subframes, as in the example system timing 200 depicted in FIG. 2. For a particular system frame defined by the system timing of the access point 110, the access point 110 may select a DRS transmission window during which a DRS may be transmitted.

The DRS transmission window may comprise one or more subframes (SFs) during which the DRS may be selectively transmitted. The DRS transmission window may be a first transmission window comprising two or more consecutive SFs (similar to the DMTC transmission windows 510, 520 depicted in FIG. 5, the DMTC transmission windows 1010, 1020, 1030, 1040 depicted in FIG. 10, and/or the DMTC transmission windows 1310, 1320 depicted in FIG. 13). Alternatively, the DRS transmission window may be a second transmission window comprising one SF (similar to the opportunistic transmission windows 511-513 and 521-523 depicted in FIG. 5, the opportunistic transmission windows 1011, 1021, 1031, 1041 depicted in FIG. 10, and/or the opportunistic transmission windows 1311, 1321 depicted in FIG. 13).

The method of transmitting the DRS may further comprise determining whether to transmit the DRS during a particular SF based on the selected DRS transmission window and transmitting the DRS to at least one access terminal, for example, the access terminal 120, during the particular SF in response to a determination to transmit the DRS. The transmitted DRS may be similar to the DRS transmissions 550, 551, 553, 560, 562, 563 depicted in FIG. 5, the DRS transmissions 1050, 1051, 1060, 1070, 1080, 1081 depicted in FIG. 10, and/or the DRS transmissions 1350, 1351, 1360, 1361 depicted in FIG. 13.

The establishing of the transmission timing and the determination as to whether to transmit the DRS during a particular SF based on the selected DRS transmission window may be performed by, for example, the processor 116 and/or memory 118 of the access point 110. Additionally or alternatively, the establishing of the transmission timing and the determination as to whether to transmit the DRS during a particular SF based on the selected DRS transmission window may be performed by, for example, dedicated modules such as the subframe indexer 162 and/or the DRS generator 164 of the access point 110. Accordingly, these components may constitute means for establishing a transmission timing for transmission of the DRS relative to a system timing of an access point, means for selecting a DRS transmission window for a particular system frame defined by the system timing of the access point, the selected DRS transmission window comprising one or more subframes (SFs) during which the DRS may be selectively transmitted, and/or means for determining whether to transmit the DRS during a particular SF based on the selected DRS transmission window.

The transmitting of the DRS to the access terminal 120 may be performed, for example, by the communication device 112 of the access point 110 or a component thereof. Accordingly, the communication device 112 of the access point 110 or a component thereof may constitute means for transmitting the DRS to at least one access terminal during the particular SF in response to a determination to transmit the DRS.

The memory 118 may constitute a computer-readable medium including code, which, when executed by a processor, causes the processor to perform operations. The computer-readable medium may be non-transitory. The computer-readable medium may include code for establishing a transmission timing for transmission of the DRS relative to a system timing of an access point, wherein code for establishing the transmission timing comprises code for selecting a DRS transmission window for a particular system frame defined by the system timing of the access point, the selected DRS transmission window comprising one or more subframes (SFs) during which the DRS may be selectively transmitted, wherein the selected DRS transmission window is selected from a group comprising a first transmission window comprising two or more consecutive SFs and a second transmission window comprising one SF, code for determining whether to transmit the DRS during a particular SF based on the selected DRS transmission window, and code for transmitting the DRS to at least one access terminal during the particular SF in response to a determination to transmit the DRS.

As will be further understood from the foregoing, an access point such as the access point 110 may be configured to perform a method of indicating a system timing of the access point 110. The access point 110 may be configured to determine a subframe index value of a particular SF relative to the system timing of the access point 110. The system timing may include system frames and subframes, as in the example system timing 200 depicted in FIG. 2. The access point 110 may be further configured to determine a subframe offset value based on the subframe index value, indicate the subframe offset value using a DRS, and transmit the DRS to at least one access terminal such as, for example, the access terminal 120, during the particular SF. The indicating of the subframe offset value may include a method similar to the flow diagram of FIG. 6, the flow diagram of FIG. 8, the flow diagram of FIG. 11, and/or any other suitable series of acts described in the present application.

The determining of the subframe index value of the particular SF, the determining of the subframe offset value based on the subframe index value and/or the indicating the subframe offset value using a DRS may be performed by, for example, the processor 116 and/or memory 118 of the access point 110. Additionally or alternatively, the determining of the subframe index value of the particular SF, the determining of the subframe offset value based on the subframe index value and/or the indicating the subframe offset value using a DRS may be performed by, for example, dedicated modules such as the subframe indexer 162 and/or the DRS generator 164 of the access point 110. Accordingly, these components may constitute means for determining of the subframe index value of the particular SF, means for determining of the subframe offset value based on the subframe index value and/or means for indicating the subframe offset value using a DRS.

The transmitting of the DRS to the access terminal 120 may be performed, for example, by the communication device 112 of the access point 110 or a component thereof. Accordingly, the communication device 112 of the access point 110 or a component thereof may constitute means for transmitting the DRS to at least one access terminal during the particular SF in response to a determination to transmit the DRS.

The memory 118 may constitute a computer-readable medium including code, which, when executed by a processor, causes the processor to perform operations. The computer-readable medium may be non-transitory. The computer-readable medium may include code for determining a subframe index value of a particular SF relative to a system timing of an access point, code for determining a subframe offset value based on the subframe index value, code for indicating the subframe offset value using a DRS, and code for transmitting the DRS to at least one access terminal during the particular SF.

As will be further understood from the foregoing, an access terminal such as the access terminal 120 may be configured to perform a method of determining a system timing of an access point such as the access point 110. The access point 110 may be configured to receive a DRS from the access point 110 during a particular SF. The received DRS may be similar to the DRS transmissions 550, 551, 553, 560, 562, 563 depicted in FIG. 5, the DRS transmissions 1050, 1051, 1060, 1070, 1080, 1081 depicted in FIG. 10, and/or the DRS transmissions 1350, 1351, 1360, 1361 depicted in FIG. 13. The access terminal 120 may be further configured to determine a subframe offset value based on the DRS, determine a subframe index value of the particular SF relative to the system timing of the access point 110 based on the determined subframe offset value, and resolve the system timing of the access point based on the determined subframe index value. This may be performed, for example, in accordance with the flow diagram of FIG. 7, the flow diagram of FIG. 8, the flow diagram of FIG. 12, and/or any other suitable series of acts described in the present application.

The receiving of the DRS from the access point 110 may be performed, for example, by the communication device 122 of the access terminal 120 or a component thereof. Accordingly, the communication device 122 of the access terminal 120 or a component thereof may constitute means for receiving a DRS from the access point 110 during a particular SF.

The determining of the subframe offset value based on the DRS, determining of the subframe index value of the particular SF relative to the system timing of the access point 110 based on the determined subframe offset value, and resolving of the system timing of the access point 110 based on the determined subframe index value may be performed by, for example, the processor 126 and/or memory 128 of the access terminal 120. Additionally or alternatively, the determining of the subframe offset value based on the DRS, determining of the subframe index value of the particular SF relative to the system timing of the access point 110 based on the determined subframe offset value, and resolving of the system timing of the access point 110 based on the determined subframe index value may be performed by, for example, dedicated modules such as the DRS decoder 172 and/or the subframe timing analyzer 174. Accordingly, these components may constitute means for determining a subframe offset value based on the DRS, means for determining a subframe index value of the particular SF relative to the system timing of the access point, based on the determined subframe offset value, and means for resolving the system timing of the access point based on the determined subframe index value.

The memory 128 may constitute a computer-readable medium including code, which, when executed by a processor, causes the processor to perform operations. The computer-readable medium may be non-transitory. The computer-readable medium may include code for receiving a DRS from an access point during a particular SF, code for determining a subframe offset value based on the DRS, code for determining a subframe index value of the particular SF relative to the system timing of the access point, based on the determined subframe offset value, and code for resolving the system timing of the access point based on the determined subframe index value.

System Information Value Tag

In a conventional technique for communicating system information, a conventional access point may transmit a master information block (MIB) that is received by a conventional access terminal. The MIB may be transmitted on, for example, a Broadcast Control Channel (BCCH) and may transmitted intermittently, for example, every 50 milliseconds. The MIB may indicate a System Frame Number (SFN) associated with the access point. The MIB may also provide PDCCH configuration information that enables the access terminal to receive control signaling on the PDCCH.

The access terminal may determine the SFN of the access point based on the MIB data and may also begin to blindly decode the data on the PDCCH using the PDCCH configuration information in the MIB data. The access terminal may blindly decode the PDDCH using a predetermined System Information Radio Network Temporary Identifier (SI-RNTI). The SI-RNTI may be a 16-bit value (for example, 0xFFFF). The access terminal may blindly decode the data on the PDCCH using the SI-RNTI until a successful decoding has been performed. As an example, a successful decoding may be indicated by performing a Cyclic Redundancy Check (CRC) on the decoded data. If the CRC is successful, then a successful decoding has been performed.

The access point may scramble SIB1 location data using the predetermined SI-RNTI. The SIB1 location data may include frequency-domain location data at which the SIB1 can be located in, for example, every fifth subframe of every eighth frame starting from SFN 0 (every 80 milliseconds). As noted above, the SI-RNTI is a fixed value that is known in advance by both the access point and the access terminal (for example, 0xFFFF). The fixed SI-RNTI value is used by the access point and access terminal to mark SI and to mark data relating to a location of SI. The access point may transmit the scrambled SIB1 location data on the PDCCH.

The access terminal may receive the scrambled transmission from the access point. As noted above, the access terminal may blindly decode the PDCCH using the predetermined SI-RNTI value.

The access terminal may successfully decode the scrambled transmission. Because the access terminal uses the predetermined SI-RNTI value to perform the successful decoding, the access terminal may determine that the scrambled data includes a location of transmitted SI.

The access terminal may determine a location of SIB1 based on the transmission. For example, the location of SIB1 may be associated with specific resource elements. Based on the determined location, the access terminal may identify the specific resource elements on which the SIB1 can be received.

The access point may transmit SIB1 in accordance with the SIB1 location data that has been previously scrambled and transmitted. As noted above, the location of SIB1 may be associated with specific resource elements. Accordingly, the access point may transmit SIB1 using those specific resource elements. The access terminal may receive SIB1 at the determined location.

The access terminal may determine the location of the remaining SIB blocks (SIB2, SIB3, etc., which may be referred to as SIBx) based on SIBx location information included in SIB1. In accordance with a conventional technique, SIB1 may carry SI window length data, SI periodicity data, and scheduling information list data. Based on the SI window length data and SI periodicity data, the access terminal may identify the radio frames and subframes to be used for SIBx transmissions. The scheduling information list data may be used as an index for locating a specific SIBx transmission (for example, SIB2, SIB3, etc.) from among the identified radio frames and subframes.

The access point may transmit SIBx in accordance with the SI window length data, SI periodicity data, and scheduling information list data. The access point 120 may receive the SIBx data at the determined location.

As can be appreciated by the foregoing, the conventional technique for communicating SI relies on a fixed timing mechanism. If the access point in the primary RAT system 200 is configured to improve coexistence by avoiding transmission at certain times and/or frequencies, then it may be impossible for the access point to transmit the SI in accordance with the fixed timing mechanism. As a result, the access terminal may not receive the SI.

To improve coexistence, the access point 110 of the present disclosure may instead be configured to transmit the data included in the MIB, SIB1, and/or SIBx with an uncertain timing, i.e., a timing that is not known in advance by the access terminal 120. In accordance with an aspect of the disclosure, the access point 110 may be configured to transmit the MIB and SIB1 within a single Enhanced System Information Block (eSIB). In some implementations, the eSIB may further include additional SI from other SIBx blocks (for example, SIB2).

The access point 110 may be configured to transmit the eSIB at any location within a DMTC window, in accordance with any suitable timing, for example, any timing set forth in the present disclosure. As an example, the DMTC window may be in any radio frame, and the duration of the DMTC window may extend over any five subframes of the radio frame (5 milliseconds). In some implementations, the access point 110 may be configured to transmit the eSIB at a timing and/or frequency that improves the coexistence of the primary RAT system 200 and the competing RAT system 202.

Because the eSIB may be transmitted with an uncertain timing (i.e., a timing that is not known in advance by the access terminal 120), the access terminal 120 must be configured to locate and recognize the eSIB.

According to one method for locating and/or recognizing the eSIB, the eSIB may include the SFN. The PDCCH may be located on the same subframe as the eSIB in the DMTC window therefore the SFN information may be obtained with the successful decoding of eSIB. As discussed in further detail below, since the DMTC window is tied to a DRS location, the access terminal 120 may search through the DMTC window for eSIB without knowledge of the exact subframe number. The potential PDCCH resource locations may be predetermined within the DMTC window with blind decoding by the access terminal 120 to resolve the exact location.

The access terminal 120 may determine a DRS location based on the location of one or more of a PSS, SSS, or CRS transmission received from the access point 110. The DRS locations of the PSS, SSS, and CRS are predetermined by the access point 110. The DMTC window may be situated within a range (for example, ±5 milliseconds) of one or more of the DRS locations. Based on the determined DRS locations, the access terminal 120 may be able to search blindly in the DMTC window for PDCCH on every subframe within the DMTC window. The CRC of the PDCCH may be scrambled using Enhanced System Information Radio Network Temporary Identifier (eSI-RNTI), which enables the access terminal 120 to ascertain that it is receiving an eSIB transmission. As noted above, the access point 110 may be configured to select the time-domain location of the eSIB so as to improve the coexistence of the primary RAT system 200 and the competing RAT system 202.

The access terminal 120 may search the DMTC window for eSIB by performing a CRC check on data in the PDCCH.

The access point 110 may transmit an eSIB flag on the PDCCH. If the indication is made within the PDCCH, the access point 110 may use a flag to indicate whether the indication is an eSIB or not. The access terminal 120 may successfully decode the scrambled transmission received from the access point 110. Because the access terminal 120 uses the predetermined SI-RNTI value to perform the successful decoding, the access terminal 120 may determine that the scrambled data includes SI.

The access terminal 120 may determine, based on the eSIB flag, that the received SIB data is eSIB data. As noted above, the eSIB flag data may be attached at a particular predetermined location, for example, a predetermined data field.

The access terminal 120 may determine the location of the SIBx blocks based on SIBx location information included in the eSIB. The location of the SIBx blocks may be determined in accordance with various aspects of the disclosure.

The access point 110 may transmit SIBx in accordance with the SIBx location information included in the eSIB that was transmitted previously. Moreover, the access terminal 120 may receive the SIBx data at the determined location.

To further improve coexistence, the access point 110 of the present disclosure may be configured to communicate whether SIBx data has been updated. In a conventional access point, a system information value tag field is included in the SIB1 payload. Every time SIBx data is updated the system information value tag field may, for example, increment. A conventional access point may use a five-bit system information value tag, such that it increments to 31 before 'rolling over' to zero. When a conventional access terminal reads the system information value tag, it can determine whether the SIBx data has been updated based on whether the system information value tag has changed since the SIBx data was last obtained.

However, as noted above, the access point 110 of the present disclosure does not transmit a conventional SIB1. Instead, the access point 110 is configured to transmit the MIB and SIB1 within a single Enhanced System Information Block (eSIB).

If the SIBx data has been updated, then the access point 110 may be configured to include a system information value tag field in the PBCH payload. Because the PBCH payload may be frequently transmitted by the access point 110 and continually monitored by the access terminal 120, the access terminal 120 can be quickly notified of changes to SIBx data. Moreover, the system information value tag of the present disclosure may be fewer than five bits, since the PBCH payload may be received more reliably than the SIB1 of the conventional approach.

Additionally, the system information value tag corresponding to the previous SIBx transmissions and the current SIBx transmissions may both be transmitted. This allows further resolution of ambiguity if the value tag held by the UE is stale information. The current value tag in this context corresponds to the SIBx transmission that is scheduled to occur at the next such opportunity. The transmission of both value tags allows the UE to make a comparison and ascertain the validity of the current SIBx information and determine the instances of system information change without ambiguity.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of indicating a system timing of an access point, comprising:
   determining a subframe index value of a particular subframe (SF) relative to the system timing of the access point;
   determining a subframe offset value based on the subframe index value;
   indicating the subframe offset value using a Discovery Reference Signal (DRS); and transmitting the DRS to at least one access terminal during the particular SF,
wherein the DRS includes a Physical Broadcast Channel (PBCH) payload that is configured to be generated in accordance with a plurality of redundancy versions, each redundancy version of the plurality of redundancy versions being associated with a particular redundancy version value, and indicating the subframe offset value using the DRS comprises:
selecting a redundancy version value that is equal to the subframe offset value; and
generating a redundancy version of the PBCH payload based on the selected redundancy version value.

2. The method of claim 1, wherein:
the particular SF is within a particular system frame defined by the system timing of the access point; and
the subframe index value is equal to a number of SFs between a first SF of the particular system frame and the particular SF.

3. The method of claim 2, wherein the subframe offset value is equal to the subframe index value and/or a number of SFs between the particular SF and a first SF of a DRS transmission window within the particular system frame.

4. The method of claim 3, wherein the first SF of the DRS transmission window is offset from the first SF of the particular system frame by one or more DRS transmission window offset SFs.

5. The method of claim 1, wherein the DRS includes a Physical Broadcast Channel (PBCH) payload having a subframe offset indicator field, and indicating the subframe offset value using the DRS comprises:
populating the subframe offset indicator field with the subframe offset value.

6. The method of claim 1, further comprising:
indicating a DRS transmission window type by indicating whether the particular SF is within a first transmission window comprising two or more consecutive SFs or a second transmission window comprising one SF.

7. The method of claim 6, wherein:
the DRS includes a Physical Broadcast Channel (PBCH) payload that is configured to be generated in accordance with a plurality of redundancy versions, each redundancy version of the plurality of redundancy versions being associated with a particular redundancy version value;
indicating the DRS transmission window type comprises:
selecting a first redundancy version value if the particular SF is within the first transmission window and selecting a second redundancy version value different from the first redundancy version value if the particular SF is within the second transmission window; and
the method further comprises:
generating a redundancy version of the PBCH payload based on the selected redundancy version value.

8. The method of claim 6, wherein:
the DRS includes a Cell-specific Reference Signal (CRS) and/or a Secondary Synchronization Signal (SSS) that is configured to be generated in accordance with a plurality of sequences, each sequence of the plurality of sequences being associated with a particular sequence value;
indicating the DRS transmission window type comprises:
selecting a first sequence value if the particular SF is within the first transmission window and selecting a second sequence value different from the first sequence value if the particular SF is within the second transmission window; and
the method, the processor is further configured to:
generating the CRS and/or the SSS based on the selected sequence value.

9. The method of claim 1, further comprising:
selecting a DRS transmission window, the selected DRS transmission window comprising one or more subframes (SFs) during which the DRS may be selectively transmitted, wherein the selected DRS transmission window is selected from a group comprising a first transmission window comprising two or more consecutive SFs and a second transmission window comprising one SF;
indicating a periodicity of the first transmission window by populating a first transmission window periodicity field of a Physical Broadcast Channel (PBCH) payload; and
indicating a boundary of the first transmission window by populating a first transmission window boundary field of the PBCH payload.

10. An apparatus for indicating a system timing of an access point, comprising:
a transceiver configured to transmit a Discovery Reference Signal (DRS) to at least one access terminal during a particular subframe (SF);
memory and at least one processor coupled to the memory, the processor being configured to:
determine a subframe index value of the particular SF relative to the system timing of the access point;
determine a subframe offset value based on the subframe index value; and
indicate the subframe offset value using the DRS,
wherein the DRS includes a Physical Broadcast Channel (PBCH) payload that is configured to be generated in accordance with a plurality of redundancy versions, each redundancy version of the plurality of redundancy versions being associated with a particular redundancy version value, and to indicate the subframe offset value using the DRS, the processor is configured to:
select a redundancy version value that is equal to the subframe offset value; and
generate a redundancy version of the PBCH payload based on the selected redundancy version value.

11. The apparatus of claim 10, wherein:
the particular SF is within a particular system frame defined by the system timing of the access point; and
the subframe index value is equal to a number of SFs between a first SF of the particular system frame and the particular SF.

12. The apparatus of claim 11, wherein the subframe offset value is equal to the subframe index value and/or a number of SFs between the particular SF and a first SF of a DRS transmission window within the particular system frame.

13. The apparatus of claim 12, wherein the first SF of the DRS transmission window is offset from the first SF of the particular system frame by one or more DRS transmission window offset SFs.

14. The apparatus of claim 10, wherein the DRS includes a Physical Broadcast Channel (PBCH) payload having a subframe offset indicator field, and to indicate the subframe offset value using the DRS, the processor is configured to:
populate the subframe offset indicator field with the subframe offset value.

15. The apparatus of claim 10, wherein the processor is further configured to:

indicate a DRS transmission window type by indicating whether the particular SF is within a first transmission window comprising two or more consecutive SFs or a second transmission window comprising one SF.

16. The apparatus of claim 15, wherein:
the DRS includes a Physical Broadcast Channel (PBCH) payload that is configured to be generated in accordance with a plurality of redundancy versions, each redundancy version of the plurality of redundancy versions being associated with a particular redundancy version value;
to indicate the DRS transmission window type, the processor is configured to:
select a first redundancy version value if the particular SF is within the first transmission window and select a second redundancy version value different from the first redundancy version value if the particular SF is within the second transmission window; and
the processor is further configured to:
generate a redundancy version of the PBCH payload based on the selected redundancy version value.

17. The apparatus of claim 15, wherein:
the DRS includes a Cell-specific Reference Signal (CRS) and/or a Secondary Synchronization Signal (SSS) that is configured to be generated in accordance with a plurality of sequences, each sequence of the plurality of sequences being associated with a particular sequence value;
to indicate the DRS transmission window type, the processor is configured to:
select a first sequence value if the particular SF is within the first transmission window and select a second sequence value different from the first sequence value if the particular SF is within the second transmission window; and
the processor is further configured to:
generate the CRS and/or the SSS based on the selected sequence value.

18. The apparatus of claim 10, wherein the processor is further configured to:
select a DRS transmission window, the selected DRS transmission window comprising one or more subframes (SFs) during which the DRS may be selectively transmitted, wherein the selected DRS transmission window is selected from a group comprising a first transmission window comprising two or more consecutive SFs and a second transmission window comprising one SF;
indicate a periodicity of the first transmission window by populating a first transmission window periodicity field of a Physical Broadcast Channel (PBCH) payload; and
indicate a boundary of the first transmission window by populating a first transmission window boundary field of the PBCH payload.

19. An apparatus for indicating a system timing of an access point, comprising:
means for determining a subframe index value of a particular subframe (SF) relative to the system timing of the access point;
means for determining a subframe offset value based on the subframe index value;
means for indicating the subframe offset value using a Discovery Reference Signal (DRS); and
means for transmitting the DRS to at least one access terminal during the particular SF,
wherein the DRS includes a Physical Broadcast Channel (PBCH) payload that is configured to be generated in accordance with a plurality of redundancy versions, each redundancy version of the plurality of redundancy versions being associated with a particular redundancy version value, and means for indicating the subframe offset value using the DRS comprises:
means for selecting a redundancy version value that is equal to the subframe offset value; and
means for generating a redundancy version of the PBCH payload based on the selected redundancy version value.

20. The apparatus of claim 19, wherein:
the particular SF is within a particular system frame defined by the system timing of the access point; and
the subframe index value is equal to a number of SFs between a first SF of the particular system frame and the particular SF.

21. The apparatus of claim 19, wherein the DRS includes a Physical Broadcast Channel (PBCH) payload having a subframe offset indicator field, and means for indicating the subframe offset value using the DRS comprises:
means for populating the subframe offset indicator field with the subframe offset value.

22. The apparatus of claim 19, further comprising:
means for indicating a DRS transmission window type by indicating whether the particular SF is within a first transmission window comprising two or more consecutive SFs or a second transmission window comprising one SF.

23. A non-transitory computer-readable medium including code, which, when executed by a processor, causes the processor to perform operations, the non-transitory computer-readable medium comprising:
code for determining a subframe index value of a particular subframe (SF) relative to a system timing of an access point;
code for determining a subframe offset value based on the subframe index value;
code for indicating the subframe offset value using a Discovery Reference Signal (DRS); and
code for transmitting the DRS to at least one access terminal during the particular SF,
wherein the DRS includes a Physical Broadcast Channel (PBCH) payload that is configured to be generated in accordance with a plurality of redundancy versions, each redundancy version of the plurality of redundancy versions being associated with a particular redundancy version value, and code for indicating the subframe offset value using the DRS comprises:
code for selecting a redundancy version value that is equal to the subframe offset value; and
code for generating a redundancy version of the PBCH payload based on the selected redundancy version value.

24. The non-transitory computer-readable medium of claim 23, wherein:
the particular SF is within a particular system frame defined by the system timing of the access point; and
the subframe index value is equal to a number of SFs between a first SF of the particular system frame and the particular SF.

25. The non-transitory computer-readable medium of claim 23, wherein the DRS includes a Physical Broadcast Channel (PBCH) payload having a subframe offset indicator field, and code for indicating the subframe offset value using the DRS comprises:
code for populating the subframe offset indicator field with the subframe offset value.

26. The non-transitory computer-readable medium of claim 23, further comprising:
code for indicating a DRS transmission window type by indicating whether the particular SF is within a first transmission window comprising two or more consecutive SFs or a second transmission window comprising one SF.

27. A method of determining a system timing of an access point, comprising: receiving a Discovery Reference Signal (DRS) from the access point during a particular subframe (SF);
determining a subframe offset value based on the DRS;
determining a subframe index value of the particular SF relative to the system timing of the access point, based on the determined subframe offset value; and
resolving the system timing of the access point based on the determined subframe index value,
wherein the DRS includes a Physical Broadcast Channel (PBCH) payload that is configured to be generated in accordance with a plurality of redundancy versions, each redundancy version of the plurality of redundancy versions being associated with a particular redundancy version value, and determining the subframe offset value based on the DRS comprises:
determining a redundancy version value of the PBCH payload; and
determining the subframe offset value based on the determined redundancy version value.

28. The method of claim 27, wherein:
the particular SF is within a particular system frame defined by the system timing of the access point; and
the subframe index value is equal to a number of SFs between a first SF of the particular system frame and the particular SF.

29. The method of claim 28, wherein the subframe offset value is equal to the subframe index value and/or a number of SFs between the particular SF and a first SF of a DRS transmission window within the particular system frame.

30. The method of claim 29, wherein the first SF of the DRS transmission window is offset from the first SF of the particular system frame by one or more DRS transmission window offset SFs.

31. The method of claim 27, wherein the DRS includes a Physical Broadcast Channel (PBCH) payload having a subframe offset indicator field populated with the subframe offset value, and determining the subframe offset value based on the DRS comprises:
reading the subframe offset value from the subframe offset indicator field.

32. The method of claim 27, further comprising:
determining a DRS transmission window type associated with the received DRS, the DRS transmission window type comprising a first transmission window comprising two or more consecutive SFs or a second transmission window comprising one SF.

33. The method of claim 32, wherein:
the received DRS includes a Physical Broadcast Channel (PBCH) payload that is configured to be generated in accordance with a plurality of redundancy versions, each redundancy version of the plurality of redundancy versions being associated with a particular redundancy version value; and
determining the DRS transmission window type comprises:
determining a redundancy version value of the PBCH payload included in the received DRS; and
determining that the DRS was received during the first transmission window if the redundancy version value is a first redundancy version value and determining that the DRS was received during the second transmission window is the redundancy version value is a second redundancy version value different from the first redundancy version value.

34. The method of claim 32, wherein:
the received DRS includes a Cell-specific Reference Signal (CRS) and/or a Secondary Synchronization Signal (SSS) that is configured to be generated in accordance with a plurality of sequences, each sequence of the plurality of sequences being associated with a particular sequence value;
determining the DRS transmission window type comprises:
determining a sequence value of the PBCH payload included in the received DRS; and
determining that the DRS was received during the first transmission window if the sequence value is a first sequence value and determining that the DRS was received during the second transmission window is the sequence value is a second sequence value different from the first sequence value.

35. The method of claim 32, further comprising:
determining a periodicity of the first transmission window by reading a first transmission window periodicity field of a Physical Broadcast Channel (PBCH) payload; and
determining a boundary of the first transmission window by reading a first transmission window boundary field of the PBCH payload.

36. An apparatus for determining a system timing of an access point, comprising:
a transceiver configured to receive a Discovery Reference Signal (DRS) from an access point during a particular subframe (SF);
memory and at least one processor coupled to the memory, the processor being configured to:
determine a subframe offset value based on the DRS;
determine a subframe index value of the particular SF relative to the system timing of the access point, based on the determined subframe offset value; and
resolve the system timing of the access point based on the determined subframe index value,
wherein the DRS includes a Physical Broadcast Channel (PBCH) payload that is configured to be generated in accordance with a plurality of redundancy versions, each redundancy version of the plurality of redundancy versions being associated with a particular redundancy version value, and to determine the subframe offset value based on the DRS, the processor is configured to:
determine a redundancy version value of the PBCH payload; and
determine the subframe offset value based on the determined redundancy version value.

37. The apparatus of claim 36, wherein:
the particular SF is within a particular system frame defined by the system timing of the access point; and
the subframe index value is equal to a number of SFs between a first SF of the particular system frame and the particular SF.

38. The apparatus of claim 37, wherein the subframe offset value is equal to the subframe index value and/or a number of SFs between the particular SF and a first SF of a DRS transmission window within the particular system frame.

39. The apparatus of claim 38, wherein the first SF of the DRS transmission window is offset from the first SF of the particular system frame by one or more DRS transmission window offset SFs.

40. The apparatus of claim 36, wherein the DRS includes a Physical Broadcast Channel (PBCH) payload having a subframe offset indicator field populated with the subframe offset value, and to determine the subframe offset value based on the DRS, the processor is configured to:
read the subframe offset value from the subframe offset indicator field.

41. The apparatus of claim 36, wherein the processor is further configured to:
determine a DRS transmission window type associated with the received DRS, the DRS transmission window type comprising a first transmission window comprising two or more consecutive SFs or a second transmission window comprising one SF.

42. The apparatus of claim 41, wherein:
the received DRS includes a Physical Broadcast Channel (PBCH) payload that is configured to be generated in accordance with a plurality of redundancy versions, each redundancy version of the plurality of redundancy versions being associated with a particular redundancy version value; and
to determine the DRS transmission window type, the processor is configured to:
determine a redundancy version value of the PBCH payload included in the received DRS; and
determine that the DRS was received during the first transmission window if the redundancy version value is a first redundancy version value and determine that the DRS was received during the second transmission window is the redundancy version value is a second redundancy version value different from the first redundancy version value.

43. The apparatus of claim 41, wherein:
the received DRS includes a Cell-specific Reference Signal (CRS) and/or a Secondary Synchronization Signal (SSS) that is configured to be generated in accordance with a plurality of sequences, each sequence of the plurality of sequences being associated with a particular sequence value; and
to determine the DRS transmission window type, the processor is configured to:
determine a sequence value of the PBCH payload included in the received DRS; and
determine that the DRS was received during the first transmission window if the sequence value is a first sequence value and determine that the DRS was received during the second transmission window is the sequence value is a second sequence value different from the first sequence value.

44. The apparatus of claim 41, wherein the processor is further configured to:
determine a periodicity of the first transmission window by reading a first transmission window periodicity field of a Physical Broadcast Channel (PBCH) payload; and
determine a boundary of the first transmission window by reading a first transmission window boundary field of the PBCH payload.

45. An apparatus for determining a system timing of an access point, comprising:
means for receiving a Discovery Reference Signal (DRS) from an access point during a particular subframe (SF);
means for determining a subframe offset value based on the DRS;
means for determining a subframe index value of the particular SF relative to the system timing of the access point, based on the determined subframe offset value; and
means for resolving the system timing of the access point based on the determined subframe index value,
wherein the DRS includes a Physical Broadcast Channel (PBCH) payload that is configured to be generated in accordance with a plurality of redundancy versions, each redundancy version of the plurality of redundancy versions being associated with a particular redundancy version value, and means for determining the subframe offset value based on the DRS comprises:
means for determining a redundancy version value of the PBCH payload; and
means for determining the subframe offset value based on the determined redundancy version value.

46. The apparatus of claim 45, wherein:
the particular SF is within a particular system frame defined by the system timing of the access point; and
the subframe index value is equal to a number of SFs between a first SF of the particular system frame and the particular SF.

47. The apparatus of claim 45, wherein the DRS includes a Physical Broadcast Channel (PBCH) payload having a subframe offset indicator field populated with the subframe offset value, and means for determining the subframe offset value based on the DRS comprises:
means for reading the subframe offset value from the subframe offset indicator field.

48. The apparatus of claim 45, further comprising:
means for determining a DRS transmission window type associated with the received DRS, the DRS transmission window type comprising a first transmission window comprising two or more consecutive SFs or a second transmission window comprising one SF.

49. A non-transitory computer-readable medium including code, which, when executed by a processor, causes the processor to perform operations, the non-transitory computer-readable medium comprising:
code for receiving a Discovery Reference Signal (DRS) from an access point during a particular subframe (SF);
code for determining a subframe offset value based on the DRS;
code for determining a subframe index value of the particular SF relative to the system timing of the access point, based on the determined subframe offset value; and
code for resolving the system timing of the access point based on the determined subframe index value,
wherein the DRS includes a Physical Broadcast Channel (PBCH) payload that is configured to be generated in accordance with a plurality of redundancy versions, each redundancy version of the plurality of redundancy versions being associated with a particular redundancy version value, and code for determining the subframe offset value based on the DRS comprises:
code for determining a redundancy version value of the PBCH payload; and
code for determining the subframe offset value based on the determined redundancy version value.

50. The non-transitory computer-readable medium of claim 49, wherein:
the particular SF is within a particular system frame defined by the system timing of the access point; and the subframe index value is equal to a number of SFs between a first SF of the particular system frame and the particular SF.

51. The non-transitory computer-readable medium of claim 49, wherein the DRS includes a Physical Broadcast Channel (PBCH) payload having a subframe offset indicator field populated with the subframe offset value, and code for determining the subframe offset value based on the DRS comprises:
   code for reading the subframe offset value from the subframe offset indicator field.

52. The non-transitory computer-readable medium of claim 49, further comprising:
   code for determining a DRS transmission window type associated with the received DRS, the DRS transmission window type comprising a first transmission window comprising two or more consecutive SFs or a second transmission window comprising one SF.

* * * * *